(12) United States Patent
Hwang et al.

(10) Patent No.: US 7,711,231 B2
(45) Date of Patent: May 4, 2010

(54) DISPLAY DEVICE UNIFORMING LIGHT DISTRIBUTION THROUGHOUT AREAS AND METHOD FOR MANUFACTURING SAME

(75) Inventors: Gyuhwan Hwang, Gyeonggi-do (KR); Youngbin Yu, Seoul (KR); Hyunsoo Lee, Seoul (KR)

(73) Assignee: Sekonix Co., Ltd., Gyeonggi-Do (KR)

( * ) Notice: Subject to any disclaimer, the term of this patent is extended or adjusted under 35 U.S.C. 154(b) by 449 days.

(21) Appl. No.: 11/569,807

(22) PCT Filed: Feb. 16, 2005

(86) PCT No.: PCT/KR2005/000419

§ 371 (c)(1),
(2), (4) Date: Nov. 30, 2006

(87) PCT Pub. No.: WO2005/116723

PCT Pub. Date: Dec. 8, 2005

(65) Prior Publication Data

US 2008/0260336 A1     Oct. 23, 2008

(51) Int. Cl.
*G02B 6/10* (2006.01)
*G02F 1/1333* (2006.01)

(52) U.S. Cl. .......... 385/131; 385/146; 349/159
(58) Field of Classification Search .......... 385/131, 385/146; 349/159
See application file for complete search history.

(56) References Cited

U.S. PATENT DOCUMENTS

| | | | | |
|---|---|---|---|---|
| 5,396,350 | A | * | 3/1995 | Beeson et al. .......... 349/62 |
| 5,462,700 | A | * | 10/1995 | Beeson et al. .......... 264/1.27 |
| 5,696,865 | A | * | 12/1997 | Beeson et al. .......... 385/146 |
| 6,636,355 | B2 | * | 10/2003 | Moshrefzadeh et al. ..... 359/460 |
| 2002/0015297 | A1 | * | 2/2002 | Hayashi et al. .......... 362/27 |
| 2002/0080484 | A1 | * | 6/2002 | Moshrefzadeh et al. ..... 359/460 |

* cited by examiner

*Primary Examiner*—K. Cyrus Kianni
(74) *Attorney, Agent, or Firm*—Mark M. Friedman

(57) ABSTRACT

Disclosed are an optical display device producing uniform light distribution and a method of fabricating such devices. The optical display device has waveguides arranged in vertical and horizontal directions. The waveguide has a conical shape whose cross-section decreases towards the light-projection side thereof. At least one of the size, height, spacing, and refraction index of the waveguide is designed to be different for each section, depending on an incident angle and/or intensity of light inputted from a light source. Therefore, the intensity of projected light can be made uniform over all sections of the optical device.

7 Claims, 19 Drawing Sheets

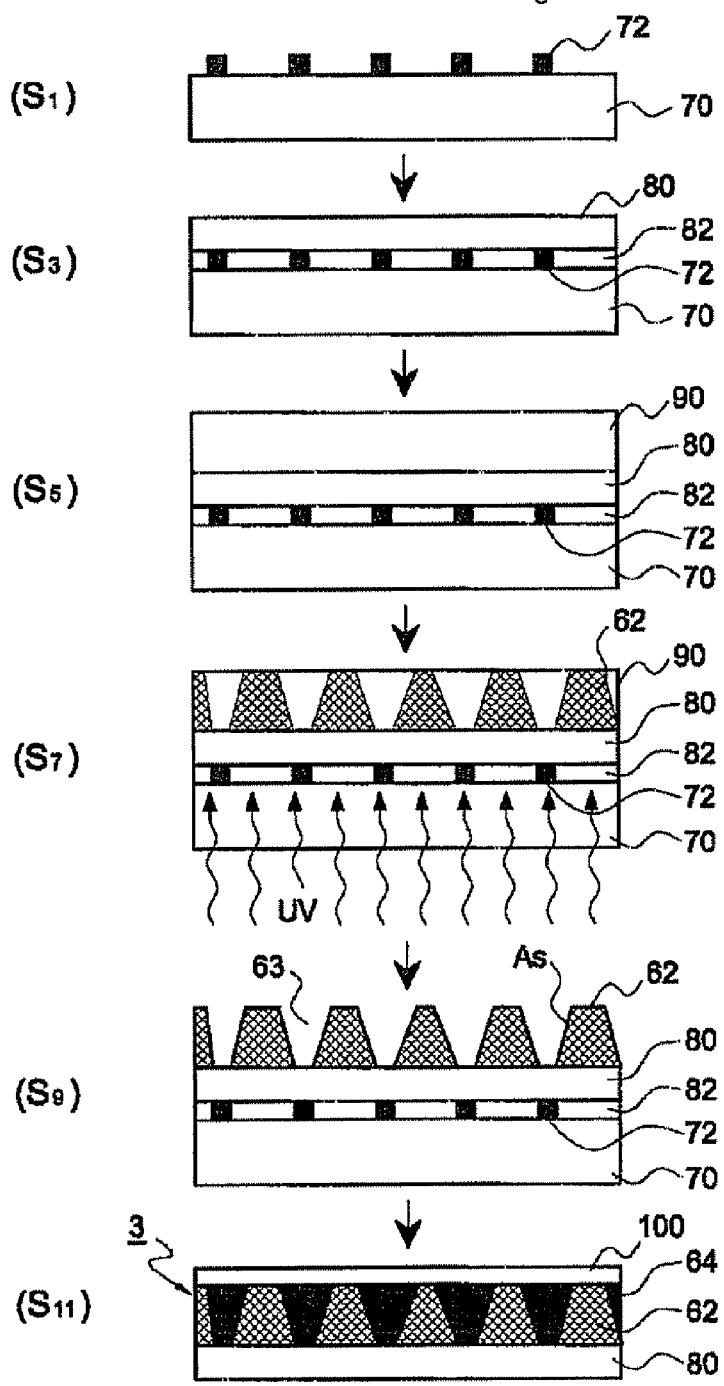
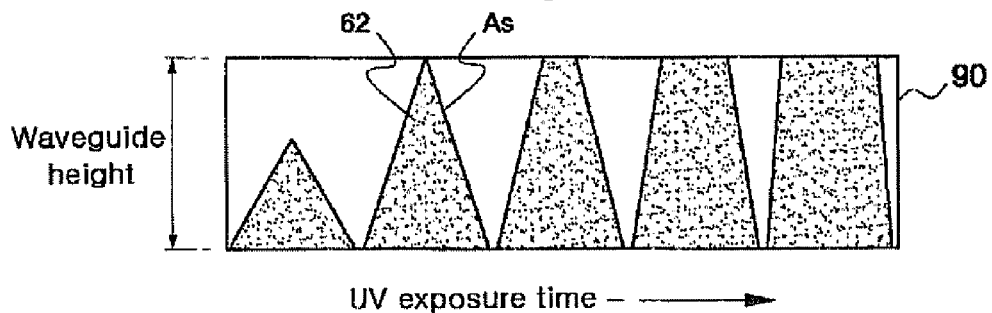

Fig. 19
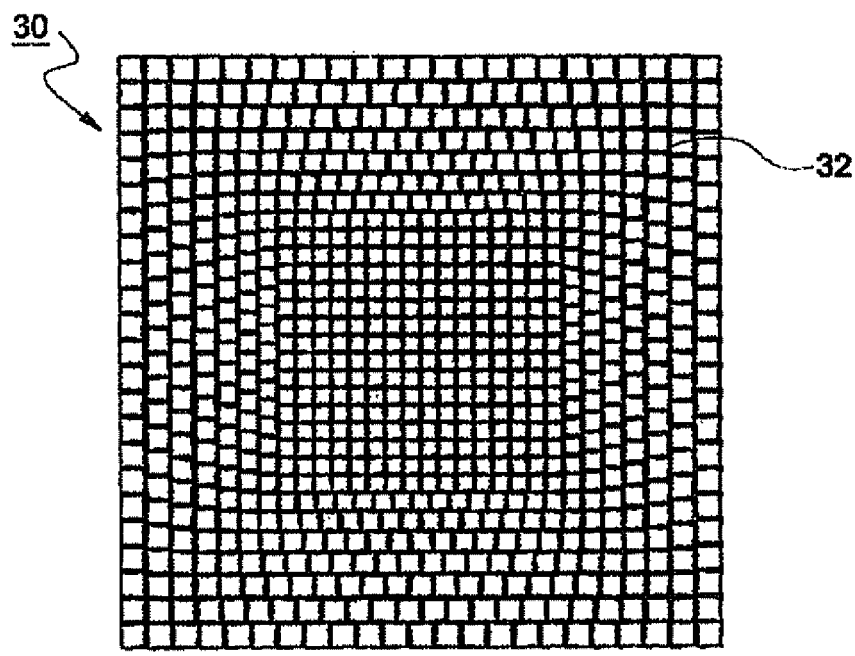
Fig. 20
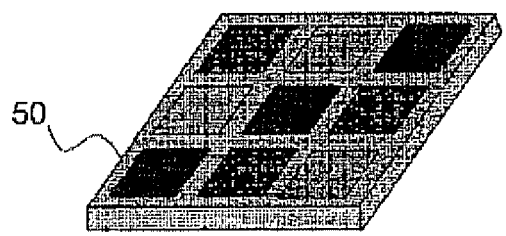
Fig. 21
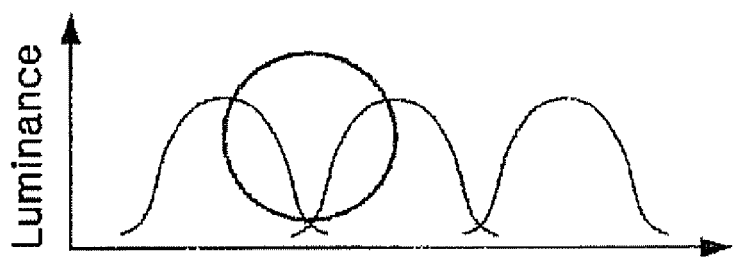
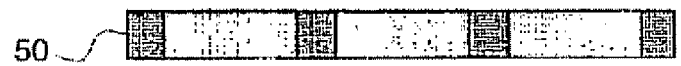
Fig. 22
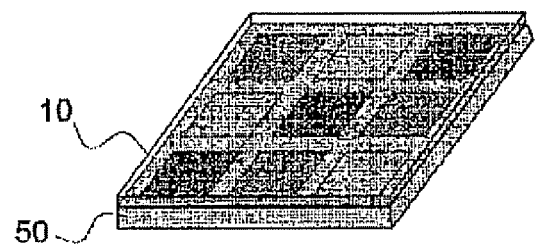

Fig. 23
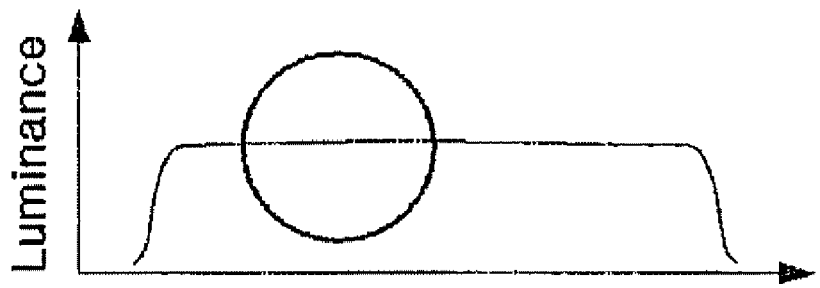
Fig. 24
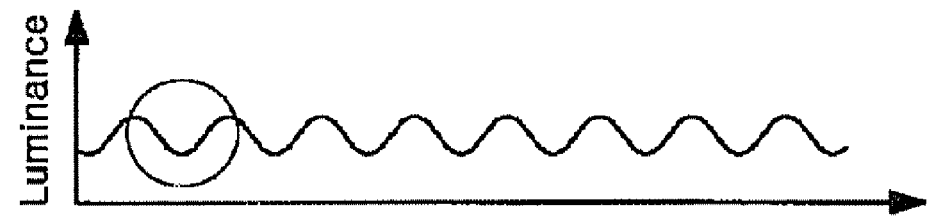
Fig. 25
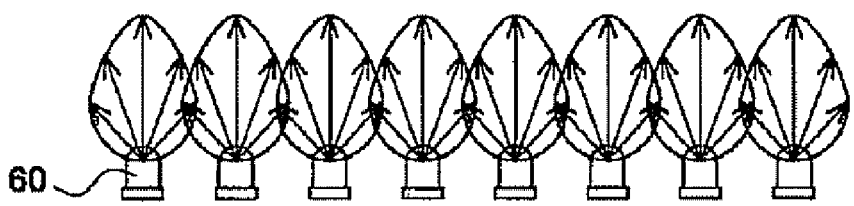
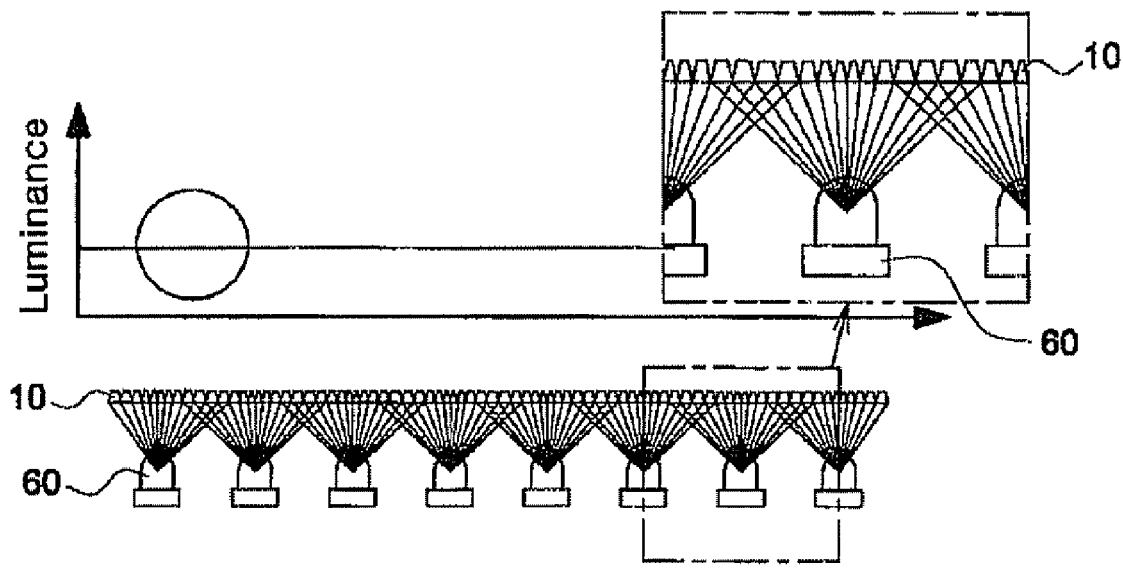

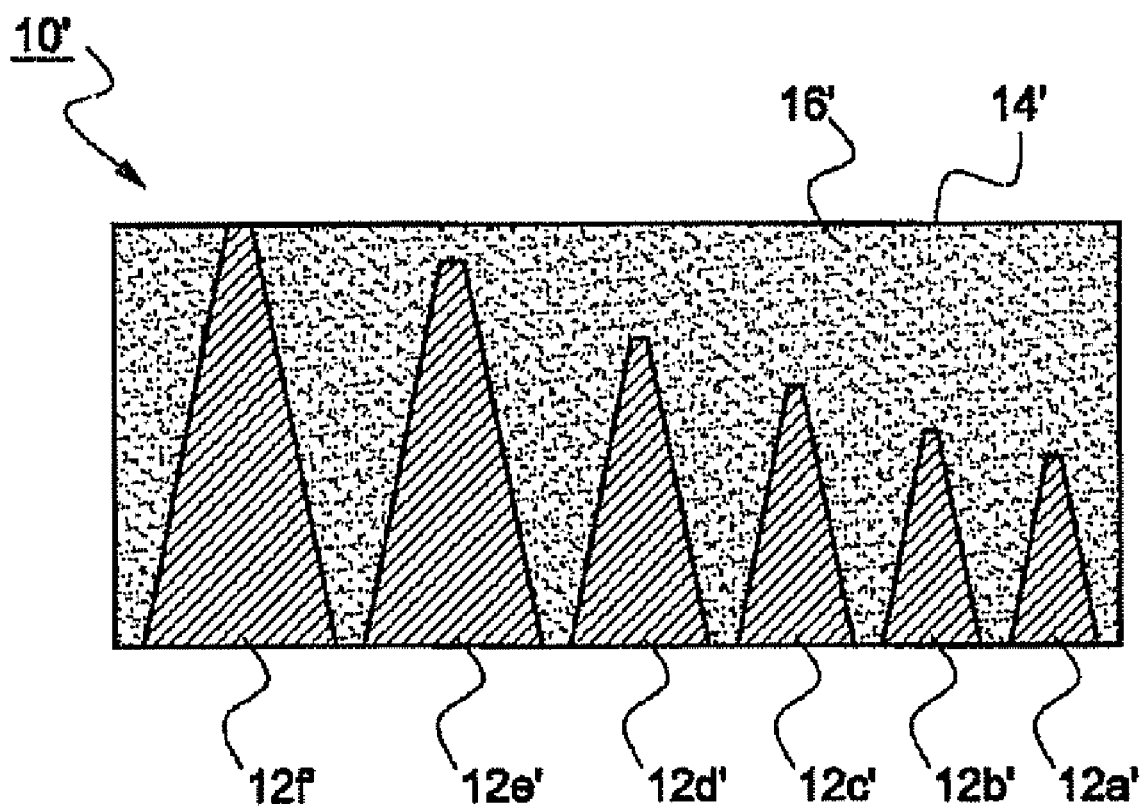

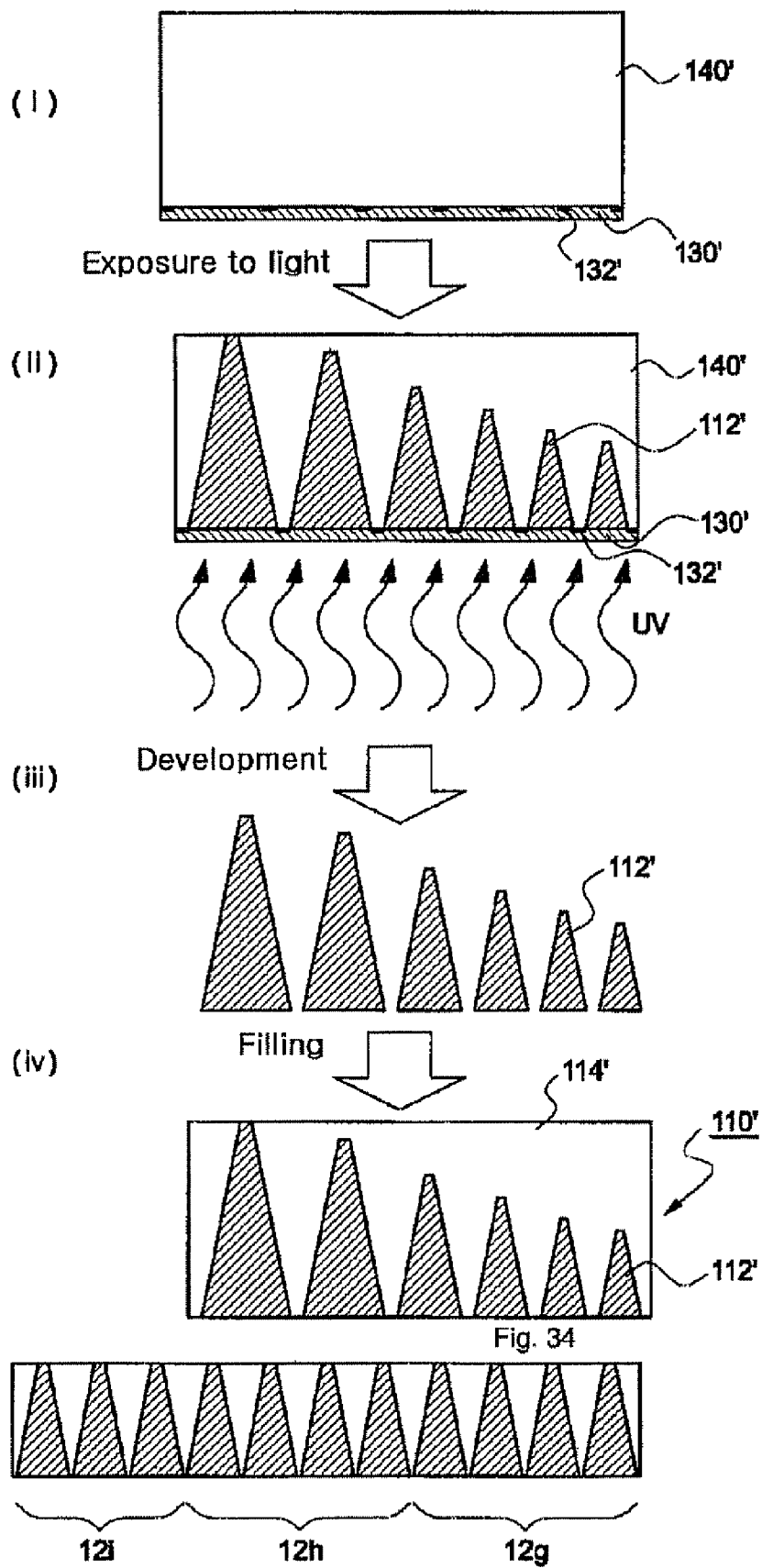

DISPLAY DEVICE UNIFORMING LIGHT DISTRIBUTION THROUGHOUT AREAS AND METHOD FOR MANUFACTURING SAME

TECHNICAL FIELD

The present invention relates to an optical display device producing a uniform light distribution over the entire area. More specifically, the invention relates to such devices and a method of fabricating the same, in which the size, the height, the spacing, and the refraction index of waveguides are all designed to be different for each section, depending on an incident angle and/or light intensity inputted from a light source, and thus a uniform light distribution can be achieved over the whole area of the optical device while maintaining a desired viewing angle, and the luminance in the peripheral area of the device can be avoided from being degraded.

BACKGROUND ART

In general, a projection device such as a projection TV, a projection monitor, or the like is equipped with a rear projection screen projecting images toward the viewer's side. This rear projection screen is one of the optical display devices designed such that the images projected from the rear side of the screen pass through a viewing space. The viewing space may be relatively large (for example, a projection TV), or may be relatively small (for example, a projection monitor). The performance of a rear projection screen can be described by various characteristics of the screen. The screen performance typically includes gain, viewing angle, resolution, contrast ratio, color, and undesirable artifacts such as specks. The rear projection screen needs to have a high resolution, a high contrast ratio, and a high gain.

In addition, it is preferable that the rear projection television has a wide viewing angle capable of covering all the viewers within a broad range of angle. In order to achieve this wide viewing angle, the screen is provided with waveguides thereinside. In a rear projection screen, inherently, a point light source is positioned rearwards of the screen center and thus the incident angles of the light are different in the central area and the peripheral area of the screen. If the entire screen is formed of waveguides of the same structure, the reflection angles inside the waveguides are different from one section of the screen to another, due to their different incident angles. Some waveguides may not experience total reflection, depending on the position thereof. Usually, the waveguides, specially designed for a wide viewing angle, come to be placed in the central area of the screen. Therefore, in a case where the screen is designed with identically structured waveguides, the intended wide viewing angle can be achieved on the whole since the peripheral area of the screen is provided with the same waveguides. However, the luminance in the peripheral area is considerably degraded relative to the central area of the screen. For this reason, the image distinctiveness and clarity are made different in the central and peripheral areas of the screen, and homogeneity in the image is consequently degraded, thereby failing to achieve a high quality image.

In particular, a large-scale display device employs a plurality of unit light sources or a single diffusive light source, and the light intensity thus becomes non-uniform throughout the screen. More specifically, in the case where a plurality of light sources is used, the light intensity is lowered in the boundary area between the light sources. When a single diffusion light source is employed, the central and peripheral areas of the screen exhibit different luminance, due to different incident angles and different light-paths. For the above reasons, the brightness is not uniform over the entire screen, consequently resulting in non-uniform image distinctiveness and clarity, and degraded image resolution.

DISCLOSURE OF INVENTION

Technical Problem

Accordingly, the present invention has been made in order to solve the above problems in the prior art. It is an object of the invention to provide an optical display device producing a uniform light distribution, in which the sidewall gradient of waveguides is designed to be different in the central and peripheral areas of a screen in such a way as to be gradually decreased radially away from the central area towards the peripheral area, thereby preventing degradation in the peripheral luminance.

Another object of the invention is to provide an optical display device producing a uniform light distribution, in which the sidewall gradient of waveguides is gradually decreased from the central area of a screen in a horizontal or vertical direction towards the peripheral area, thereby achieving a uniform luminance over the entire screen.

A further object of the invention is to provide a method of fabricating such optical display devices, in which ultraviolet-exposing time varies with each section of a screen using a line-scanning mode, thereby enabling the formation of waveguides having a sidewall gradient gradually decreasing toward the peripheral area from the central area.

A further object of the invention is to provide an optical display device producing a uniform light distribution, in which the size, the height, the spacing, and the refraction index of waveguides is designed to be different for each section, depending on incident angle and/or intensity of light inputted from a light source, thereby achieving a uniform light distribution over the whole area of the optical device.

A further object of the invention is to provide an optical display device, in which the line spacing of a photomask is set up to be different, depending on incident angle and/or intensity of a light inputted from a light source, thereby achieving a uniform light distribution over the whole area of the optical device.

Technical Solution

In order to accomplish the above objects, according to one aspect of the invention, there is provided an optical display device producing a uniform light distribution, the optical display device including waveguides each having a sidewall inclined from the bottom side thereof, imaging light rays incident from a light source placed rearwards of the center of the optical device being reflected inside the waveguide to be projected to the outside of the waveguide, wherein the waveguides arranged over the whole section of a screen have a same bottom side and a same height, and simultaneously the sidewall gradient in the waveguides is decreased gradually, within an angle range within which a total reflection occurs, towards the peripheral area of the screen from the central area thereof, such that the imaging light rays are less frequently reflected in the waveguide in the peripheral area of the screen, as compared with the waveguides in the central area of the screen.

According to another aspect of the invention, there is provided an optical display device producing a uniform light distribution, the optical display device including waveguides each having a sidewall inclined from the bottom side thereof, imaging light rays incident from a light source placed rearwards of the center of the optical device being reflected inside the waveguide to be projected to the outside of the waveguide, wherein the waveguides arranged over the whole section of a screen have a same bottom side and a same height, and simultaneously the sidewall gradient in the waveguides is decreased gradually, within an angle range within which a total reflection occurs, towards the radially peripheral area of the screen from the central area thereof, depending on the incident angle, such that the waveguides at a radially same distance from the central area have a same sidewall gradient in symmetrical fashion with respect to the central area.

According to yet another aspect of the invention, there is provided an optical display device producing a uniform light distribution, the optical display device including waveguides each having a sidewall inclined from the bottom side thereof, imaging light rays incident from a light source placed rearwards of the center of the optical device being reflected inside the waveguide to be projected to the outside of the waveguide, wherein the waveguides arranged over the whole section of a screen have a same bottom side and a same height, and the sidewall gradient in the waveguides is gradually decreased simultaneously within an angle range within which a total reflection occurs, along either a horizontal direction or a vertical direction, towards the peripheral area of the screen from the central area thereof, depending on the incident angle.

According to a further aspect of the invention, there is provided a method of fabricating the above-described optical display device. The method comprises: a first step of placing a grid on a photomask and attaching a transparent substrate on the grid; a second step of coating a photopolymer material on the transparent substrate; a third step of radiating ultraviolet rays in a line-scanning mode on the photopolymer material from below the photomask the exposure time of the ultraviolet rays being controlled for each section of a screen so as to form waveguides having a sidewall gradient decreasing gradually towards the peripheral area along one direction from the central area of the screen; and a fourth step of attaching a front transparent plate on the waveguides.

According to a further aspect of the invention, there is provided an optical display device producing a uniform light distribution, the optical display device having waveguides arranged in vertical and horizontal directions, the waveguide having a conical shape whose cross-section decreases towards the light-projection side thereof, wherein at least one of the size, height, spacing, and refraction index of the waveguide is designed to be different for each section, depending on incident angle and/or intensity of a light inputted form a light source such that the intensity of projected light can be made uniform over the entire section of the optical device.

According to a further aspect of the invention, there is provided an optical display device producing a uniform light distribution, the optical display device having waveguides arranged in vertical and horizontal directions, the waveguide having a conical shape whose cross-section decreases towards the light-projection side thereof, wherein the size of the waveguide is designed to be different for each section, depending on incident angle and/or intensity of light inputted from a light source such that the intensity of projected light can be made uniform over the entire section of the optical device.

According to a further aspect of the invention, there is provided an optical display device producing a uniform light distribution, the optical display device having waveguides arranged in vertical and horizontal directions, the waveguide having a conical shape whose cross-section decreases towards the light-projection side thereof, wherein the refraction index of the waveguide is designed to be different for each section, depending on incident angle and/or intensity of light inputted from a light source such that the intensity of projected light can be made uniform over the entire section of the optical device.

According to a further aspect of the invention, there is provided a method of fabricating an optical display device, the optic display device having different-sized waveguides for different sections. The method comprises the steps of: attaching a photopolymer on a photomask having a grid structure whose line spacing is non-uniform, radiating ultraviolet rays on the photopolymer from outside of the photomask such that waveguides having different sizes are formed in the photopolymer due to the non-uniform line spacing of the grid structure of the photomask; removing the photopolymer excepting the formed waveguide portions through a development process; and filling a resin having a low refraction index in a valley-like space between the waveguides formed through the development process.

ADVANTAGEOUS EFFECTS

As described above, in the present invention, the sidewall gradient of waveguides is designed to be different in the central and peripheral areas of a screen in such a way as to be gradually decreased radially away from the central area towards the peripheral area. Thus, degradation in the peripheral luminance can be avoided. In addition, the sidewall gradient of waveguides is gradually decreased from the central area of a screen in a horizontal or vertical direction towards the peripheral area, thereby achieving uniform luminance over the entire screen.

Furthermore, the size, height, spacing, and refraction index of waveguides are designed to be different for each section, depending on incident angle and/or intensity of light inputted from a light source. Therefore, a uniform light distribution can be achieved over the whole area of the optical device, and homogeneity in the projected image can be consequently enhanced.

In addition, a low index resin is filled in the valley-like space between the waveguides and a light diffuser is added to the low index region, thereby further improving the uniform light distribution. Here, the mated particle size, and contents of the light diffuser can be controlled to adjust the light distribution.

BRIEF DESCRIPTION OF THE DRAWINGS

Further objects and advantages of the invention can be more fully understood from the following detailed description taken in conjunction with the accompanying drawings in which:

FIG. 12 is a process diagram explaining a method of fabricating the optical display device illustrated in FIGS. 9 to 11;

FIG. 13 is a schematic diagram showing the variation of the sidewall gradient with the light-exposing time;

FIG. 19 is a plan view showing the grid structure of a photomask used in the manufacturing process of FIG. 18;

FIG. 20 shows a display panel such as an LCD or an LED;

FIG. 21 is a graph showing the luminance for every section of the display panel of FIG. 20;

FIG. 22 illustrates a display panel having an optical device of the invention mounted thereon;

FIG. 23 is a graph showing the luminance for every section of the display panel of FIG. 22;

FIG. 24 shows a conventional optical device using a plurality of unit light sources;

FIG. 25 shows an optical device of the invention using a plurality of unit light sources;

FIG. 32 is a partial sectional view of another embodiment modified from that of FIG. 31;

FIG. 33 is a process diagram explaining a method of fabricating an optical device according to the third embodiment of the invention and illustrated in FIGS. 29 to 31;

FIG. 34 is a partial sectional view of an optical display device producing a uniform light distribution according to a fourth embodiment of the invention;

BEST MODE FOR CARRYING OUT THE INVENTION

The preferred embodiments of the present invention will be hereafter described in detail with reference to the accompanying drawings. The embodiments of the invention will be explained, illustrating a projection screen.

FIGS. 1 to 4 are schematic diagrams showing the reflection of imaging light rays inside different waveguides having different designs.

Figure 1:
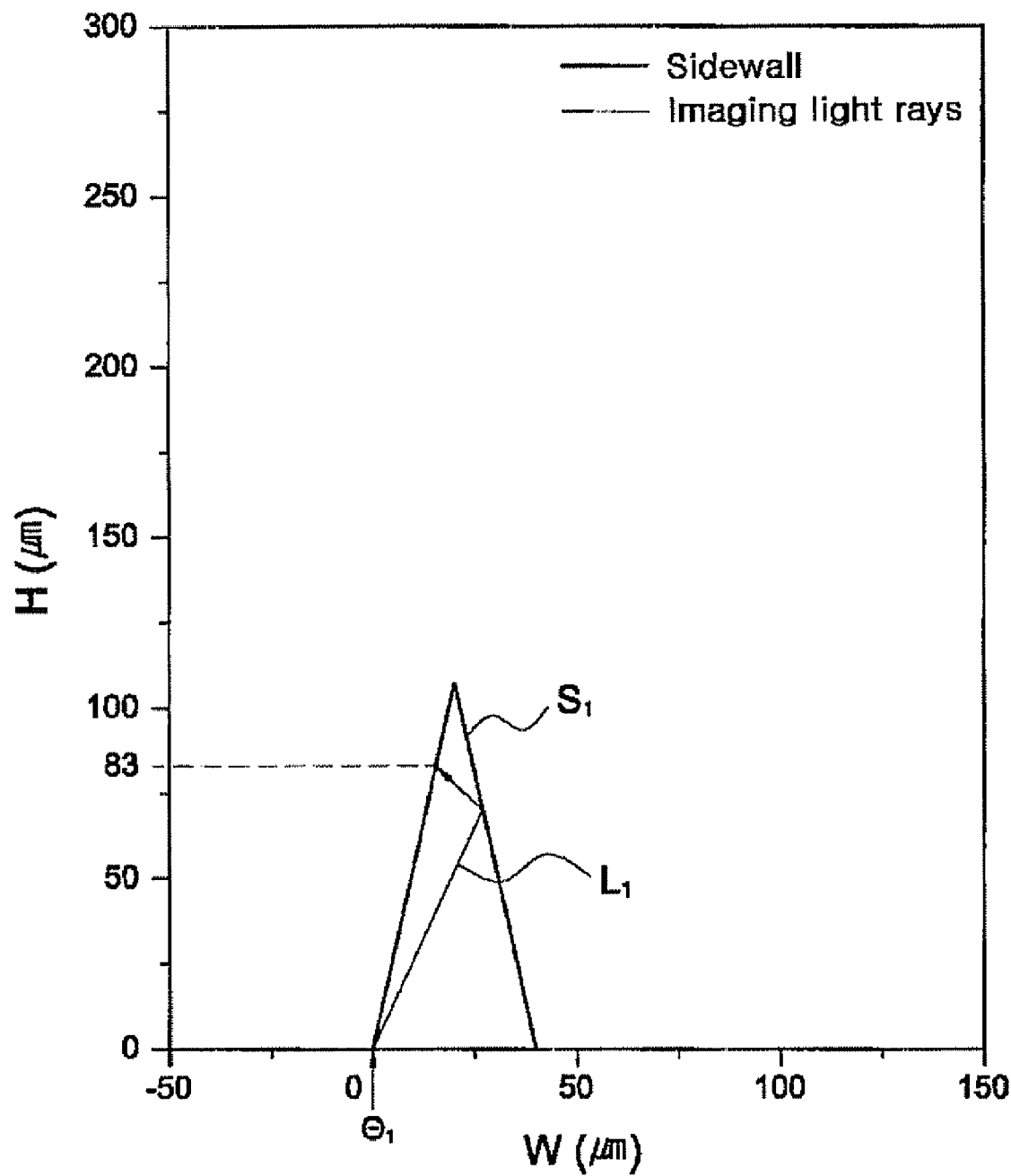
FIGS. 1 to 4 are schematic diagrams showing the reflection of imaging light rays inside different waveguides having different designs.
Figure 2:
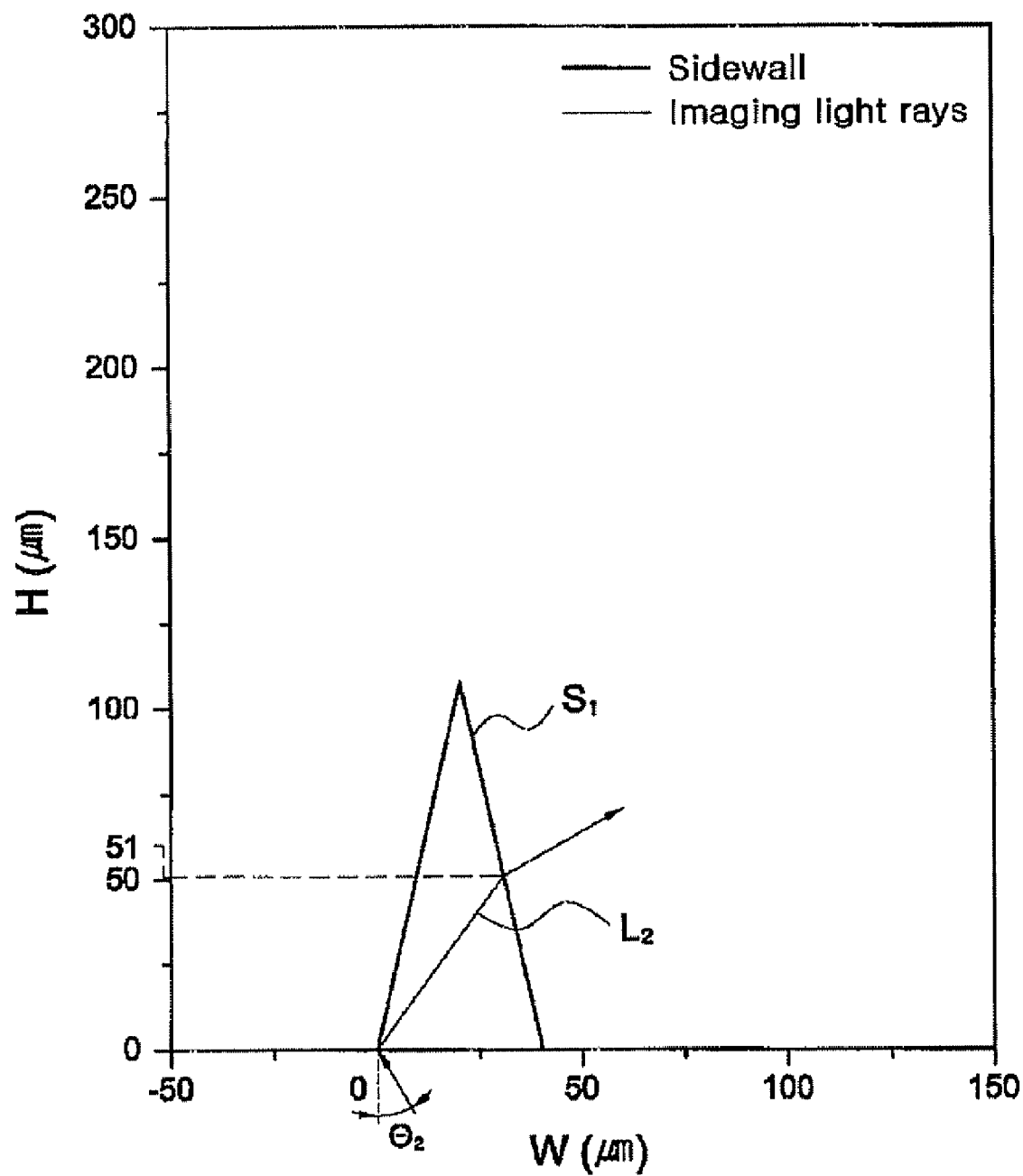

Referring to FIGS. 1 and 2, the principles for a waveguide design in order to obtain uniform luminance will be explained. FIGS. 1 and 2 are diagrams showing the reflection of imaging light rays inside a waveguide, where the length of its bottom face is 40 nm and the gradient of its sidewall is 10.52° Specifically, FIG. 1 shows the reflection of imaging light rays in the case of an incident angle of zero degree (0° and FIG. 2 is in a case of 10 of incident angle. Here, the incident angle is measured with respect to the normal line to the light input surface of the waveguide.

In addition to the length of the bottom face and the gradient of the sidewall, the refection index of the waveguide is 1.6, the refraction index of the projection surface is 1, the critical angle for total reflection inside the waveguide is 54.35° and the critical angle for total reflection on the projection surface (*e tip of the waveguide) is 38.68° Typically, a point light source is positioned rearwards of the screen center, and thus a waveguide placed in the screen center has an incident angle $q_1$ of zero degree (0°), as in FIG. 1. The imaging light rays $L_1$ are reflected on the sidewall $S_1$ of the waveguide. With this incident angle $q_1$, the imaging light rays perform a total reflection until the second reflection. The second-reflected imaging light rays $L_1$ again reach the sidewall $S_1$ at the height of approximately 83 mm, as illustrated in FIG. 1. In order to achieve a wide viewing angle, commonly, at least one or two reflections are needed, and in order to obtain a high luminance, a total reflection is required. Thus, in the central area of the screen, the length of the waveguide needs to be determined to be no more than a height corresponding to three times that of the reflections to thereby meet the above conditions. As the frequency of total reflections increases, the viewing angle is widened. Preferably, the height of the waveguide is determined to be within a range of from 73 mm (second reflection) to 83 mm (third reflection).

On the other hand, since the point light source is placed rearwards of the screen center, in the outer peripheral area of a screen, the imaging light rays $L_2$ are incident at a certain angle, not vertically, as shown in FIG. 2. In the case where the incident angle $q_2$ is 10° the imaging light rays perform a total reflection on the sidewall S1 at the time of first reflection only. At this time, as depicted in FIG. 2, the height of the waveguide needs to be determined to be no more than about 51 mm in order to obtain a high luminance. This is because, if a total reflection does not occur inside a waveguide, light loss is caused inside the waveguide, degrading the luminance.

In view of the above explanation in conjunction with FIGS. 1 and 2, if it is assumed that a waveguide has the same length of bottom face and the same gradient of sidewall, waveguides in the central area of the screen need to be designed to have a height of 73~83 mm. In contrast, it is preferable that the waveguide in the peripheral area of the screen is designed to have a height within 50 mm. Thus, if this consideration is reflected upon the design of a waveguide, the screen becomes higher in its central area and lower in its outer peripheral areas and thus the screen cannot have a uniform height. Consequently, overall, the screen has an even surface, which is not preferable in terms of the viewing angle and the resolution thereof, and which also leads to a complicated manufacturing process.

Figure 3:
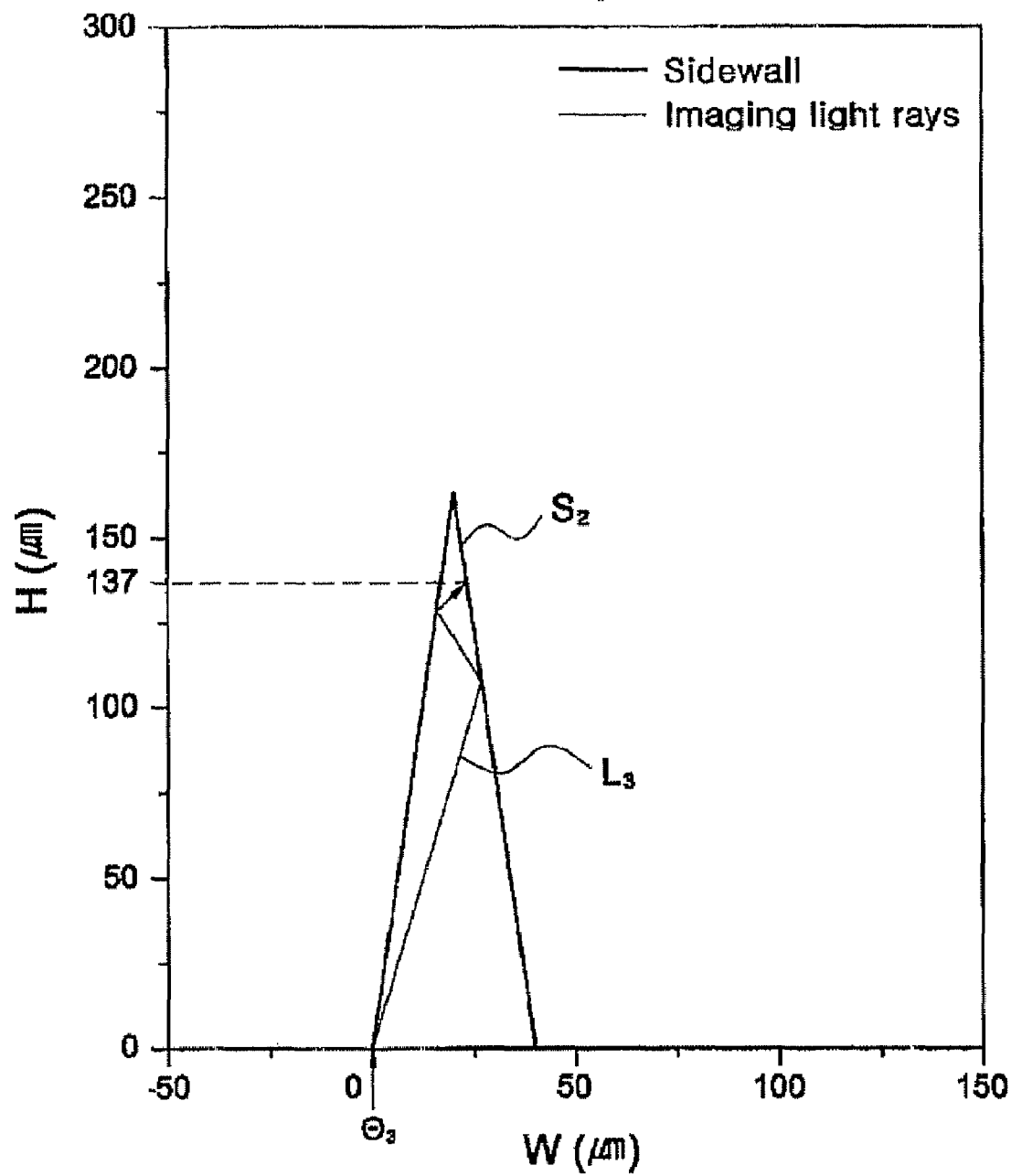
Figure 4:
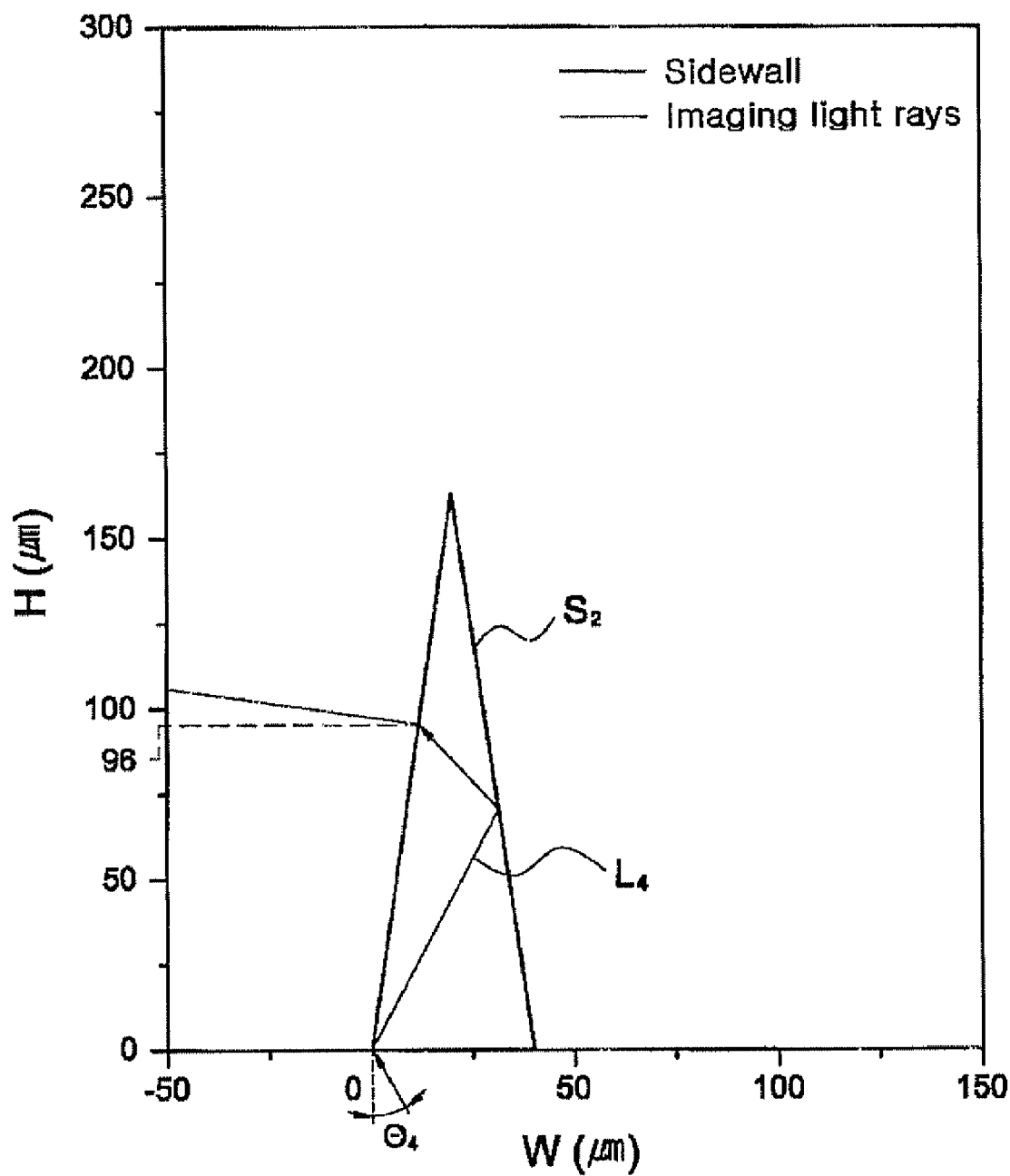

In addition, FIGS. 3 and 4 are schematic diagrams showing the reflection of imaging light rays inside a waveguide, the length of whose bottom face is 40 mm and the gradient of whose sidewall is 7° More specifically, FIG. 3 shows the relationship between the imaging light rays and the waveguide structure in the case where the incident angle is zero degrees (0°), and FIG. 4 is a case where the incident angle is ten degrees (10°).

The refraction index, the critical angle for total reflection, and the length of the bottom face are the same as in both FIGS. 1 and 2, and the gradient of the sidewall (7°) is different from the previous illustration of FIGS. 1 and 2. In the case where the incident angle $q_3$ is 0° as shown in FIG. 3, the incident imaging light rays $L_3$ are totally reflected on the sidewall $S_2$ until the third reflection. At is time, total reflection occurs within the height of 137 mm.

On the other hand, when the incident angle $q_4$ is 10 degrees (°), the imaging light rays L4 perform a total reflection until second reflection, as shown in FIG. 4. The maximum height of the waveguide, within which total reflection occurs, is 96 mm, and thus the height of the waveguide needs to be determined to be no more than 96 mm in order to obtain a high luminance.

In view of the above explanation in conjunction with FIGS. 3 and 4, if the height of the waveguide is designed so as to be suitable for the peripheral waveguides where the incident angle is 7 degrees (°), the central waveguides in the screen experience only one total reflection, thus failing to achieve an effective viewing angle. Generally, it is preferable that the screen is configured such that its central area has a wider viewing angle. Therefore, it is preferable that the central waveguides are designed so as to cause at least two ties of total reflections.

Figure 6:
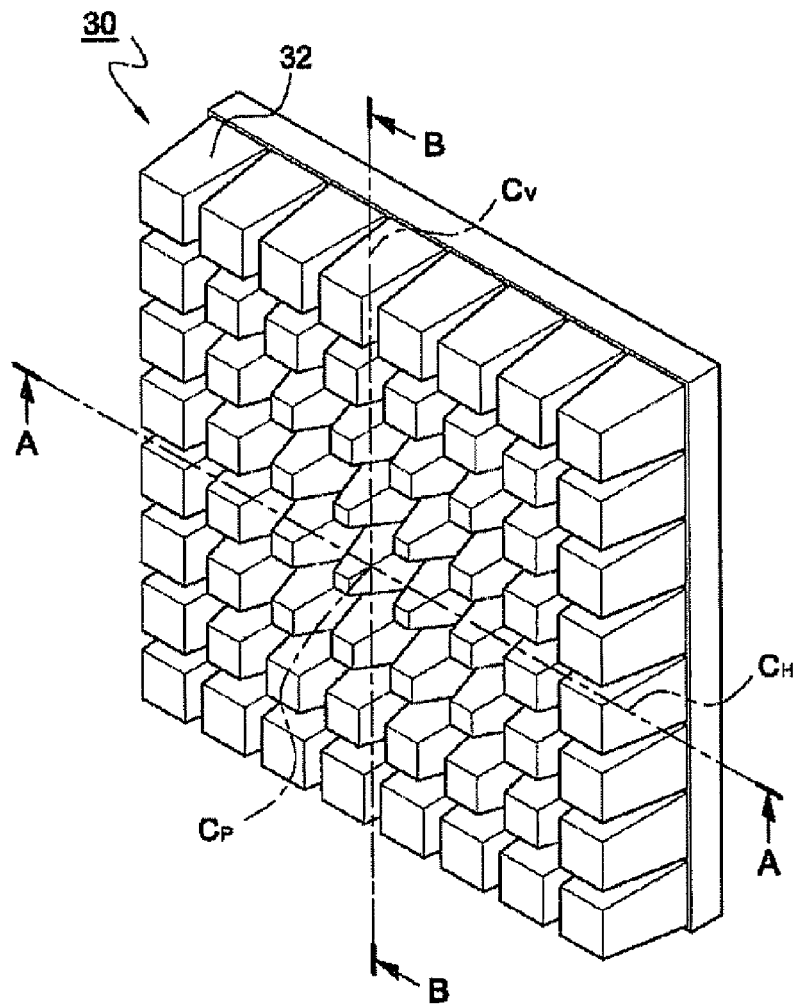
FIGS. 6 to 8 show one example for the configuration of the waveguides in the optical display device in FIG. 5.
Figure 7:
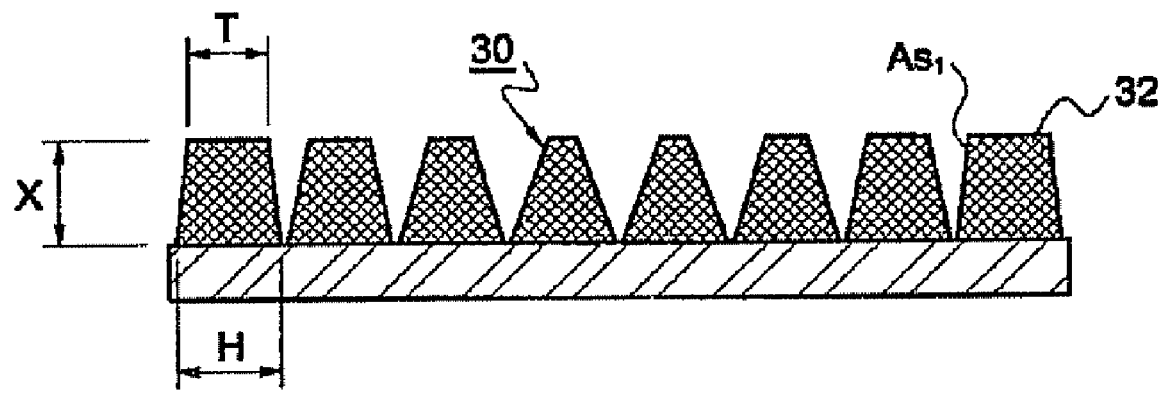
Figure 8:
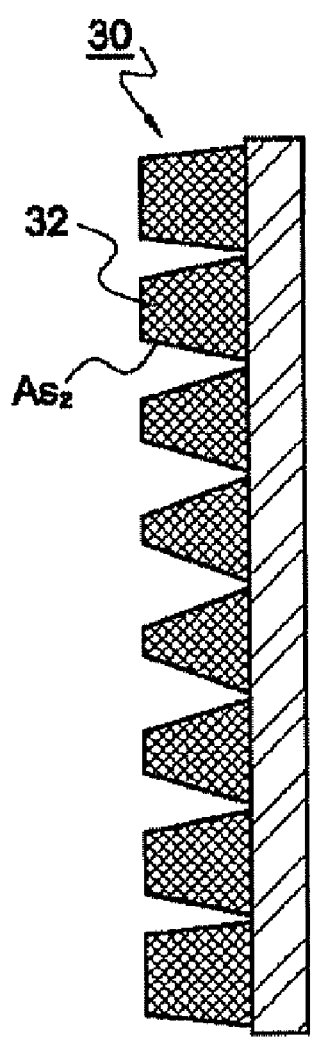

Considering the above two cases where the gradient of sidewall is 10.52° (FIGS. 1 and 2) and 7° (FIGS. 3 and 4), an optimum condition for total reflection can be determine over the entire area of a screen. For example, the height of the waveguide is established to be 80 mm, which is within a common height range where a total reflection can occur in both the central and the peripheral area of the screen. Simultaneously, the gradient of the waveguide is determined to be 10.52° for the central area of the screen and 7° for the peripheral area of the screen. More specifically, the central waveguides of the screen are configured such that the sidewall thereof has a gradient of 10.52° as illustrated in FIGS. 1 and 2. The peripheral waveguides of the screen are structured so as to have a gradient of 7° as illustrated in FIGS. 3 and 4. In this way, one or two times of total reflections can occur in all the waveguides arranged over the whole screen, and thus a wide viewing angle can be achieved in the central area thereof and a high luminance can be obtained in the peripheral area thereof. Here, the sidewall gradients of the waveguides are designed so as to decrease gradually towards the peripheral waveguides from the central ones in the screen. That is, the sidewall gradient is decreased gradually by a certain increment of angle towards the outer waveguides within the range of 10.52~7° over the entire screen. Thus, the sidewall gradient may decrease towards the outer peripheral waveguides in a symmetrical pattern about the screen center or in a non-symmetrical fashion. As one exemplary approach, the sidewall gradient may be gradually decreased in a concentric pattern in such a way that the same magnitude of gradient is provided to the waveguides placed at the same distance from the central waveguide. In this case, the sidewall gradient decreases gradually in radial direction towards the outer periphery of the screen from the center thereof, thus achieving a uniform luminance in vertical and horizontal directions, i.e., along the radial directions. An exemplary screen according to this embodiment is illustrated in FIGS. 6 to 8.

As an alternative, the sidewall gradient may be decreased gradually towards the peripheral ara of the screen along the horizontal or vertical direction from the horizontal center of the screen or from the vertical cent thereof. In this case, the gradual decrease of the gradient is applied to either one of the horizontal and vertical directions, and thus the luminance can be improved along any one direction only. However, even if the luminance is improved along any one direction so as to be suitable to its use, a common screen or monitor is enabled to provide a distinct and clear image. This will be hereinafter explained in detail, in conjunction with FIGS. 9 to 11.

Figure 5:
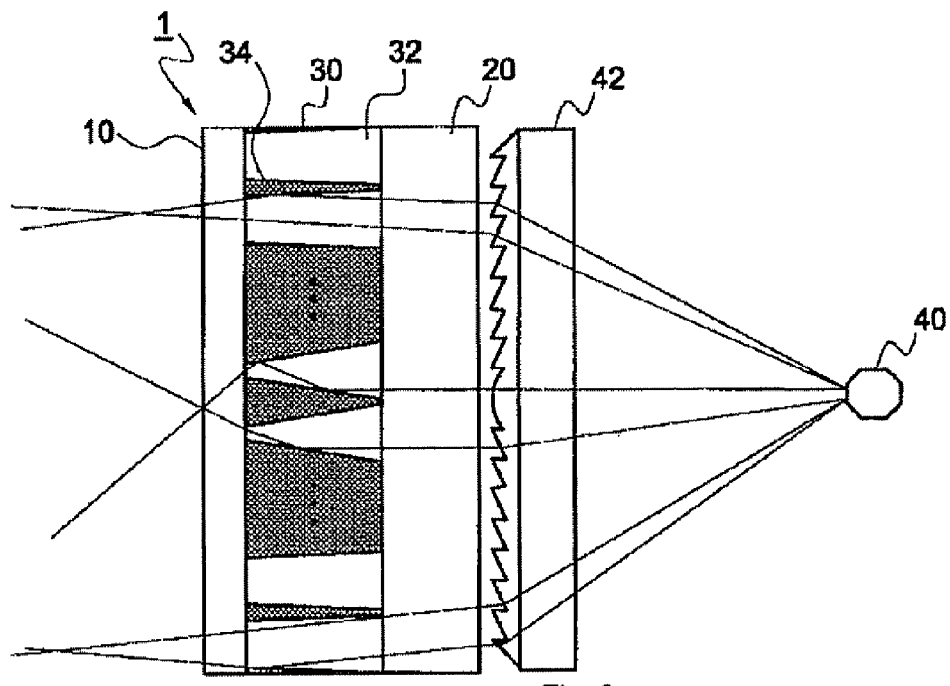
FIG. 5 is a sectional view of an optical display device producing a uniform light distribution according to a first embodiment of the invention, where the invention is applied to a projection screen.

FIG. 5 is a sectional view of an optical display device producing a uniform light distribution according to a first embodiment of the invention, where the invention is applied to a projection screen. In FIG. 5, the projection screen of the invention is generally denoted at 1. FIGS. 6 to 8 show one example for the configuration of the waveguides in the optical display device in FIG. 5. FIG. 6 is a perspective view of the waveguide array, FIG. 7 is a sectional view taken along the line A-A in FIG. 6, and FIG. 8 is a sectional view taken along the line B-B in FIG. 6.

As illustrated in FIG. 5, the projection screen 1 of this embodiment includes a front transparent plate 10, a rear transparent substrate 20, and a waveguide array 30 interposed in-between. A unit waveguide 32 (hereinafter, referred to as a "waveguide") is structured to have a smaller bottom face to a light source 40 side and a larger top face contacted with the front transparent plate 10. That is, the waveguide 32 is structured such that its cross-section is gradually narrowed towards the front side of the screen, to which imaging light rays L are projected. Thus, the waveguides 32 have an inclined sidewall, and consequently may have the she of a conical frustum or a polypyramidal frustum. In this embodiment, the waveguide is illustrated to have a pyramidal frustum. Between the waveguides 32 is formed a space, in which a light-absorbing material 34 is filled. The light-absorbing material 34 absorbs light rays incident from the outside of the screen so that the imaging light projected from the inside can be viewed more clearly and distinctly. The light absorbing material 34 is formed of a mixture of a monarch-carbon black, a baysilone-platinum catalyst, and a vinyl silicone material.

As depicted in FIG. 6, in the waveguide array 30, a horizontal centerline $C_H$ and a vertical centerline $C_V$ intersect at the center point $C_P$. The waveguides at the same distance from the center point $C_P$ have the same sidewall gradient $A_S$. At the same time, the sidewall gradient $A_S$ of the waveguide 32 is decreased gradually towards the outer peripheral area of the screen 1 from the center point $C_P$ thereof. Thus, the sidewall gradient $A_S$ of the waveguide 32 gradually decreases in a concentric pattern toward the outer part of the screen 1 from the center thereof. When sectioned along an arbitrary line passing through the center point $C_P$, the screen 1 has a left-right symmetrical structure, in particular, in terms of the sidewall gradient of the waveguides. At this time, the concentric pattern may include a circular concentric pattern and an oval-concentric pattern. A circular concentric pattern is more efficient. For example, in the cross-section of the waveguide array 30 taken along the horizontal centerline as shown in FIG. 7, the sidewall gradient $A_{S1}$ of the waveguides is formed in a left-right symmetrical fashion about the center point $C_P$. As shown in FIG. 8, in the cross-section of the waveguide array 30 taken along the vertical centerline of the screen 1, the sidewall gradient $A_{S2}$ of the waveguides 32 is formed in a up-down symmetrical fashion about the center point $C_P$.

The sidewall gradient $A_S$ of the waveguide 32 is defined with respect to the normal ha to the light input surface of the waveguide as follows.

$$A_S = \tan^{-1}((h-t)/X), h=H/2, t=T/2.$$

Here, H denotes the length of the bottom side, T denotes the length of the topside, and X is the height of the waveguide in the vertical cross-section of the waveguide.

The waveguides placed in the central area of the screen are preferred to have a sidewall gradient of 10~12° and the waveguides placed in the outermost area thereof are preferred to have a sidewall gradient of 6~8° In addition, preferably, the pitch, which is the spacing between the bottom sides of the waveguides, is determined to be less than 3 mm.

In addition, the refraction index of the waveguide 32 is 1.4~1.6, the refraction index of the light projection surface is 1.0~1.2, and the refraction index of the light-absorbing material 34 is 1.2~1.3. When a diffusion plate is applied to the front face of the waveguide 32, the refraction index of the waveguide 32, the light projection surface, and the light-absorbing material 34 are preferred to be 1.6, 1.0, and 1.2 respectively. If the diffusion plate is not employed, the refraction index of the waveguide 32, the light projection surface, and the light-absorbing material 34 are preferred to be 1.6, 1.1, and 1.2 respectively.

In this case, the critical angle for total reflection inside the waveguide is 45~50° and the critical angle for total reflection on the light projection she is 35~60° For example, if a diffusion plate is employed, the critical angle for total reflection inside the waveguide is preferred to be 45~50° and the critical angle for total reflection on the light projection surface is preferred to the 40~45° In addition, when the diffusion plate is not employed, the critical angle for total reflection inside the waveguide is preferred to be 45~50° and the critical angle for total reflection on the light projection surface is preferred to be 35~40°

Consequently, over the entire screen 1, each waveguide 32 has the same length H of the bottom side and the same height X. Due to the variation in the sidewall gradient $A_S$, the length T of the topside varies with the waveguides. Here, it is preferable that the sidewall gradient $A_S$ between the adjacent waveguides is varied within 2%, the topside between the adjacent waveguides is varied within 5%.

The waveguides placed in the central area of the screen 1 have the highest sidewall gradient $A_S$ and thus the incident image light rays are outputted after being totally reflected several times, at least two or more times, thereby resulting in a wider viewing angle. In contrast, the sidewall gradient $A_S$ of the waveguide 32 is gradually dec towards the peripheral area of the screen. Accordingly, for the waveguides placed in the outer peripheral area, hex total reflection of imaging light is less frequent. Therefore, the peripheral area of the screen 1 has a relatively narrower viewing angle due to less frequent total reflections, but remains within the allowed frequency of total reflection, thereby minimizing the light loss and thus preventing degradation in luminance.

MODE FOR THE INVENTION

Figure 9:
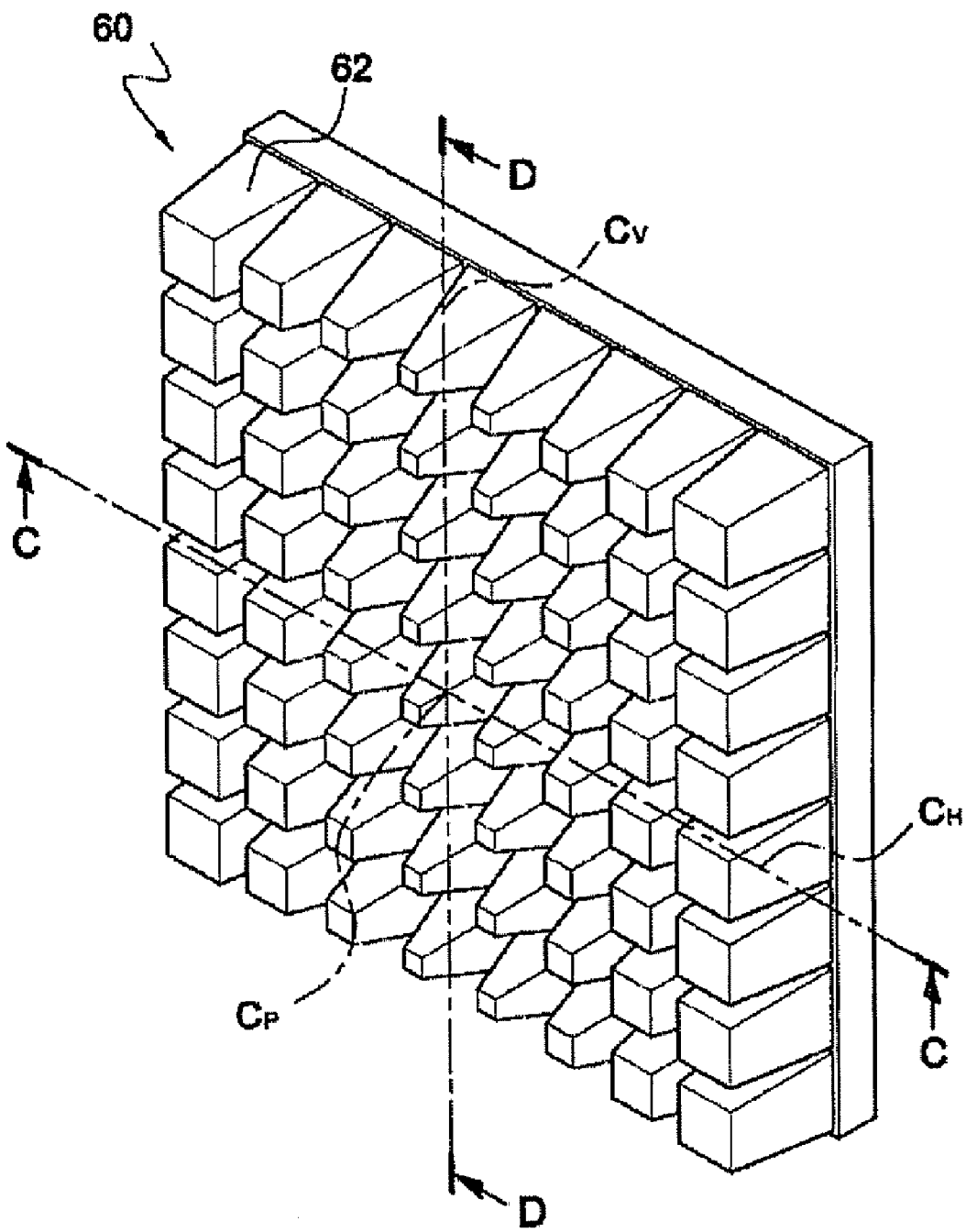
FIGS. 9 to 11 illustrate another embodiment of the waveguide structure in the optical display device in FIG. 5.
Figure 10:
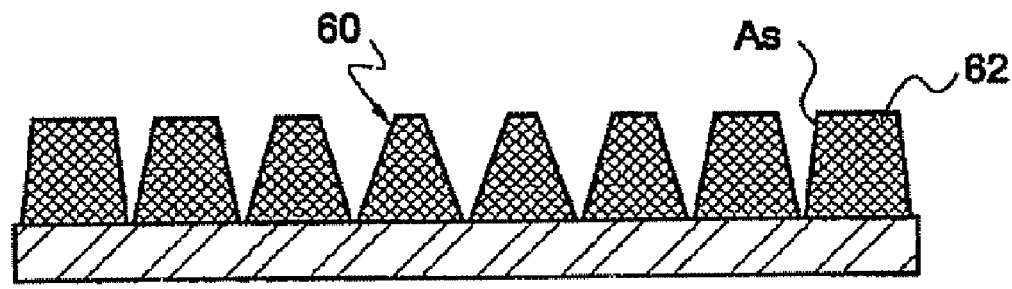
Figure 11:
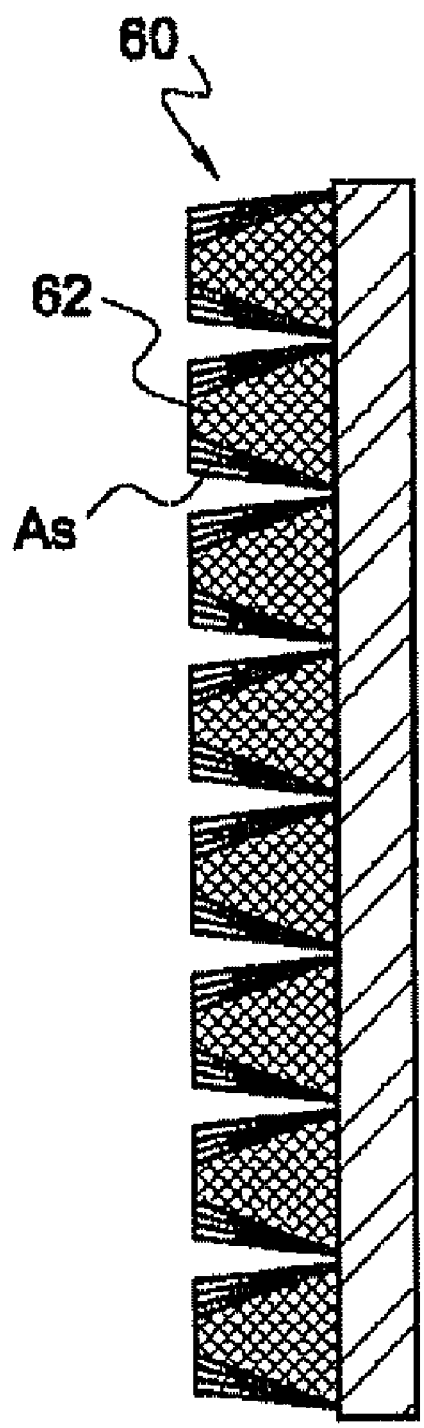

FIGS. 9 to 11 illustrate another embodiment of the waveguide structure in the optical display device in FIG. 5. FIG. 9 is a perspective view of the waveguide array, which is denoted by reference numeral 60, FIG. 10 is a sectional view ten along the line C-C in FIG. 9, and FIG. 11 is a sectional view taken along the line D-D in FIG. 9.

As illustrated in FIGS. 9 and 10, the waveguide array 60 of this embodiment is designed such that the sidewall gradient $A_S$ of the waveguide 62 is gradually decreased towards the peripheral area of the screen in a horizontal direction from the vertical centerline $C_V$. That is, the sidewall gradient $A_S$ varies in a left-right symmetrical fashion about the vertical centerline $C_V$. For example, the sidewall gradient of the waveguide 62 placed in the center is 10.52° the outermost waveguide has a sidewall gradient of 7° and the sidewall gradients of the waveguides in-between are gradually decreased within the range of 10.52~7° On the other hand, all (the waveguides along the vertical direction have the same sidewall gradient. In this embodiment, the sidewall gradient of waveguide is decreased gradually along the horizontal direction from the vertical centerline, but remains constant along the vertical direction. However, the opposite case, i.e., the case where the waveguide array 60 is rotated by 90 degrees (°), is included in the embodiments of the invention. Therefore, in this embodiment, the sidewall gradient decreases in a symmetrical pattern with respect to either the horizontal centerline or the vertical centerline, thus enhancing the luminance of the peripheral area of the screen.

FIG. 12 is a process diagram explaining a method of fabricating the optical display device illustrated in FIGS. 9 to 11. FIG. 13 is a schematic diagram showing the variation of the sidewall gradient with the light-exposing time.

The method of fabricating a screen 3, in which the sidewall gradient of the waveguides is decreased gradually along one direction, will be described, referring to FIG. 12. First, a grid 72 is placed on the photomask 70 and a transparent substrate 80 is attached on top of the grid 72 (step $S_1$, $S_3$). Then, due to the grid 72, a gap is formed between the photomask 70 and the transparent substrate 80. In order to remove the gap, a filling material 82 is filled in the gap. The filling material may employ a high-purity isopropanol alcohol (IPA). The transparent substrate 80 may be formed of a transparent resin such as polyethylene terephthalate (PET), polymethyl methacrylate (PMMA), or methyl methacrylate styrene (MS) copolymer.

Thereafter, a photopolymerizable material 90 is coated on the transparent substrate 80 (step $S_5$). The photopolymerizable material 90 may be formed by mixing two or more materials selected from ethoxylated (3) bisphenol A diacrylate, trimethylolpropane triacrylate, irgacure, irganox, and the like. Preferably, the photopolymerizable material 90 may be formed by mixing all the above four materials, more specifically, 40~80 wt % of diacrylate, 0.5~10 wt % of triacrylate, 0.5~12 wt % of irgacure, and 0.5~12 wt % of irganox. Here, diacrylate is an ultraviolet polymerizable monomer, triacrylate is a monomer for adjusting viscosity, irgacure is an ultraviolet polymerization initiator, and irganox is an inhibitor against oxide formation.

Next, ultraviolet rays are radiated to form a waveguide 62 shape in the photopolymerizable material 90 (step $S_7$). When radiating the ultraviolet rays, a line scanning method is used to control the exposing time for each section and thus forms a waveguide 62 having different sidewall gradients for different sections. As shown in FIG. 13, as the light exposure time is extended, the sidewall gradient $A_S$ of the waveguide 62 is decreased. On the contrary, as the light exposure time is shortened, the sidewall gradient $A_S$ of the waveguide 62 is increased. Thus, according to this principle, when performing the line scanning, the exposure time is decreased gradually towards the central area from one horizontal end of the substrate such that the center point thereof has the minimum exposure time. After passing the center point, the exposure time is gradually increased towards the other horizontal end of the substrate. Thus, the sidewall gradients of de waveguides are distributed in a left-right symmetrical pattern in such a way as to be decreased towards both the left and right ends of the substrate from the center point.

Excepting the waveguide 62 shape formed through the UV exposure, the unexposed portion is developed and removed (step $S_9$). Then, a space is formed between the waveguides. A light-absorbing material 64 is filled in the space 63 and a front transparent plate 100 is then attached, thus completing the projection screen 3 of the invention (step $S_{11}$). The front transparent plate 100 may be made of the same material as the transparent substrate 80.

The operation and effects of the invention will be described in greater detail, referring to FIG. 5.

The light rays emitted from the light source 40 are converted into imaging light rays containing images. Then, the imaging light rays are converted into substantially parallel light rays through a Fresnel lens 42 and incident on the screen 1. Thus, the imaging light rays pass through the rear transparent substrate 20 and are inputted into the waveguide 32. While passing through the waveguide, the light rays are reflected on the sidewall and projected towards the front of the screen so as be seen by a viewer. At this time, since the waveguides in the central area of the screen 1 have a larger sidewall gradient, the light reflection occurs relatively frequently. The incident angle in the central area is zero degree (0°), and thus the imaging light rays are outputted after two or three times of total reflections inside the waveguide to thereby widen the viewing angle thereof. In contrast in the peripheral area of the screen, the waveguides 32 have a relatively smaller sidewall gradient, the incident imaging light rays are less frequently reflected inside the waveguide before being outputted. Therefore, in the outer peripheral area of the screen, the light loss caused through reflection can be maximally suppressed such that the peripheral luminance is almost the same as it is in the central area. In this way, according to the present invention, the sidewall gradient of the waveguides 32 is adjusted to a suitable value for every section of the screen to thereby achieve quality images in terms of the viewing angle and luminance thereof.

FIG. 5 illustrates only the central and peripheral waveguides 32, but the screen contains numerous waveguides in-between. The areas between the waveguides are filled with a light-absorbing material 34 for absorbing external lights incident into the screen 1, thereby improving the distinctiveness and clarity of the imaging light rays projected from the inside. A diffuser may be applied to the front transparent plate 10.

Figure 14:
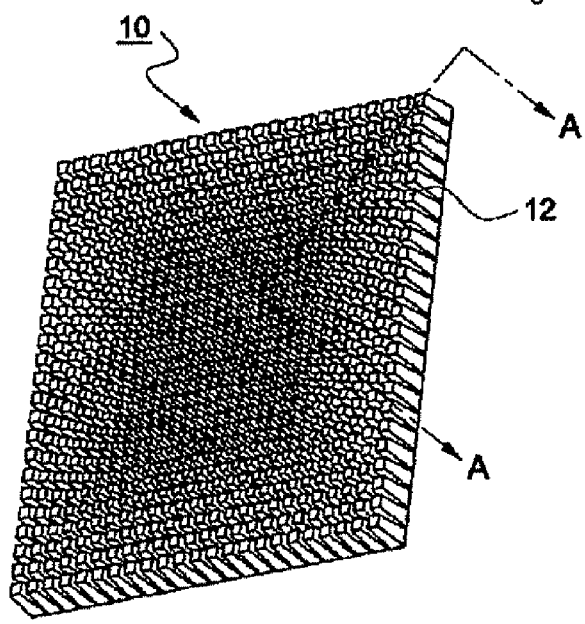
FIGS. 14 and 15 are a front and rear perspective view of an optical display device producing a uniform light distribution according to a second embodiment of the invention.
Figure 15:
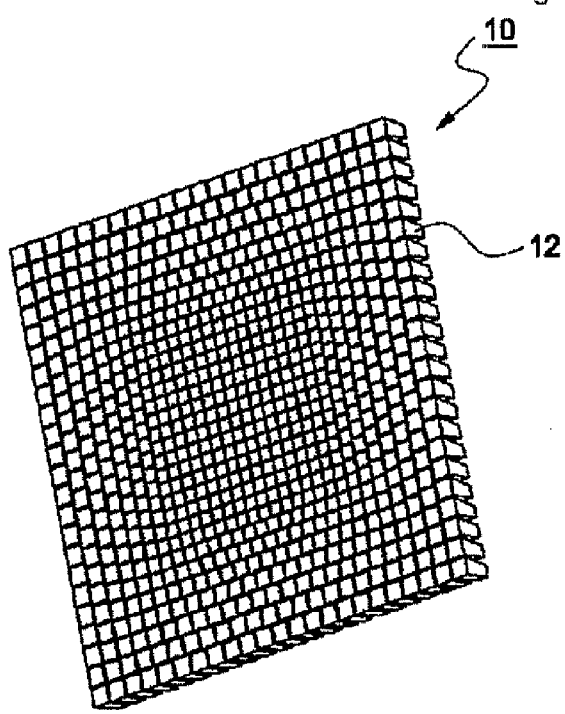
Figure 16:
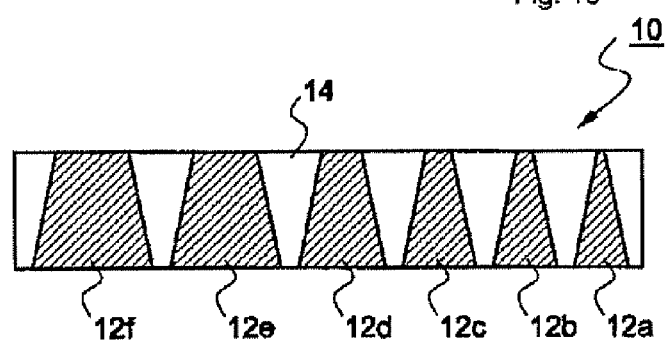
FIG. 16 is a sectional view taken along the line E-E in FIG. 14.
Figure 17:
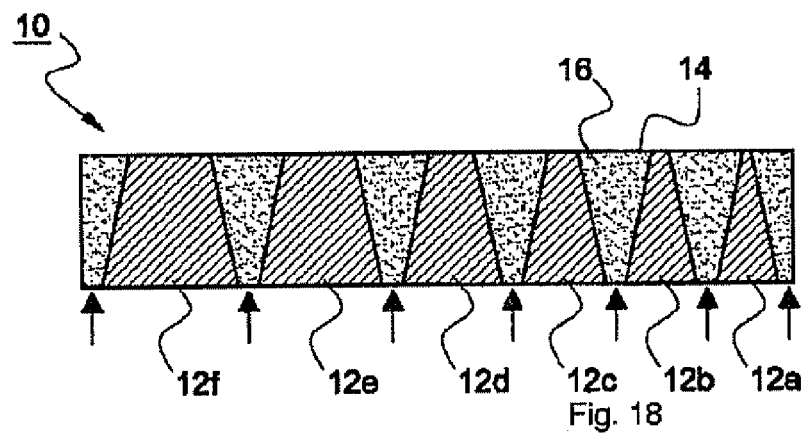
FIG. 17 is a partial sectional view of a modified example of FIG. 16.

FIGS. 14 and 15 are a front and rear perspective view of an optical display device producing a uniform light distribution according to a second embodiment of the invention. FIG. 16 is a sectional view taken along the line E-E in FIG. 14, and FIG. 17 is a partial sectional view of a modified example of FIG. 16. In this embodiment, the waveguides have a uniform height. In addition, the optical device according to the invention may or may not be provided with a transparent protection plate attached to the front face or the rear face thereof. The following embodiments illustrate cases having no transparent protection plate attached thereto, and are referred to as an "optical device."

In the optical display device 110 of this embodiment, the waveguide 112 has a truncated conical shape whose cross-sectional area gradually decreases towards the light output surface thereof. These waveguides are arranged in vertical and horizontal directions. In particular, the height of the waveguide 112 is uniform over the whole region of the optical device 110, but the size thereof varies over the entire area of the device. That is, as shown in FIG. 16, the size of the waveguides 112a to 112f increases gradually towards the peripheral area of the optical device 110 from the central area thereof, mom precisely, towards the peripheral area along the radial direction from the central area having a large amount of incident light rays. More specifically, from the central area of the optical device towards the peripheral area thereof, the topside and the bottom side of the waveguides 112 to 112f are gradually increased, and the sidewall gradient thereof is gradually decreased. Thus, in FIG. 16, the rightmost waveguide 112a corresponding to the center of the optical device has the smallest size, and the leftmost waveguide 11f corresponding to the outermost area of the optical device has the largest size.

Furthermore, the spacing between the waveguides 112 may vary to adjust light distribution. Between the waveguides 112 is formed a valley-like space, in which a resin 114 having a low reaction index is filled. The low index resin 114 may include vinyl silicone, hydride containing silicone, or the like. The refraction index of the waveguide 112 is larger than that of the low index resin 114, but the smaller the difference in their refraction indices the better. For example, it is preferable that the refraction index of the waveguide 112 is 1.3~2.0, and that of the resin 114 is no more than 1.3. Of course, if the waveguide has a higher refraction index beyond the above range, the refraction index of the resin 114 becomes higher by as much. As illustrated in FIG. 17, the low index resin 114 may contain a light diffuser 116 for generating light diffusion. That is, in the case where a large amount of light rays are incident through the gap between the bottom sides of the waveguides 112a to 112f, preferably a light diffuser 116 is added to the low index resin 114 to allow the light to be diffused thereinside. In this way, the light diffuser 116 is used so that the light introduced outside the waveguide can be prevented from being lost and a more uniform light distribution can be achieved. The light diffuser 116 may be comprised of light transmissive fine spherical particles.

On the other hand, instead of the light diffuser, the low index resin 114 may be mixed with a light-absorbing material (not shown) as in the previous embodiment. The light-absorbing material may be added, in the case where the amount of light introduced between the bottom sides of the waveguides is small to the extent that it does not affect the entire light quantity, or whenever required for other purposes. The light-absorbing material absorbs light rays incident from the outside of the optical device so that the imaging light projected from the inside can be viewed more clearly and distinctly. The light absorbing material is formed of a mixture of a monarch-carbon black, a baysilone-platinum catalyst, and a vinyl silicone material. Optical devices such as projection TVs and rear projector screens employ the light-absorbing material.

Figure 18:
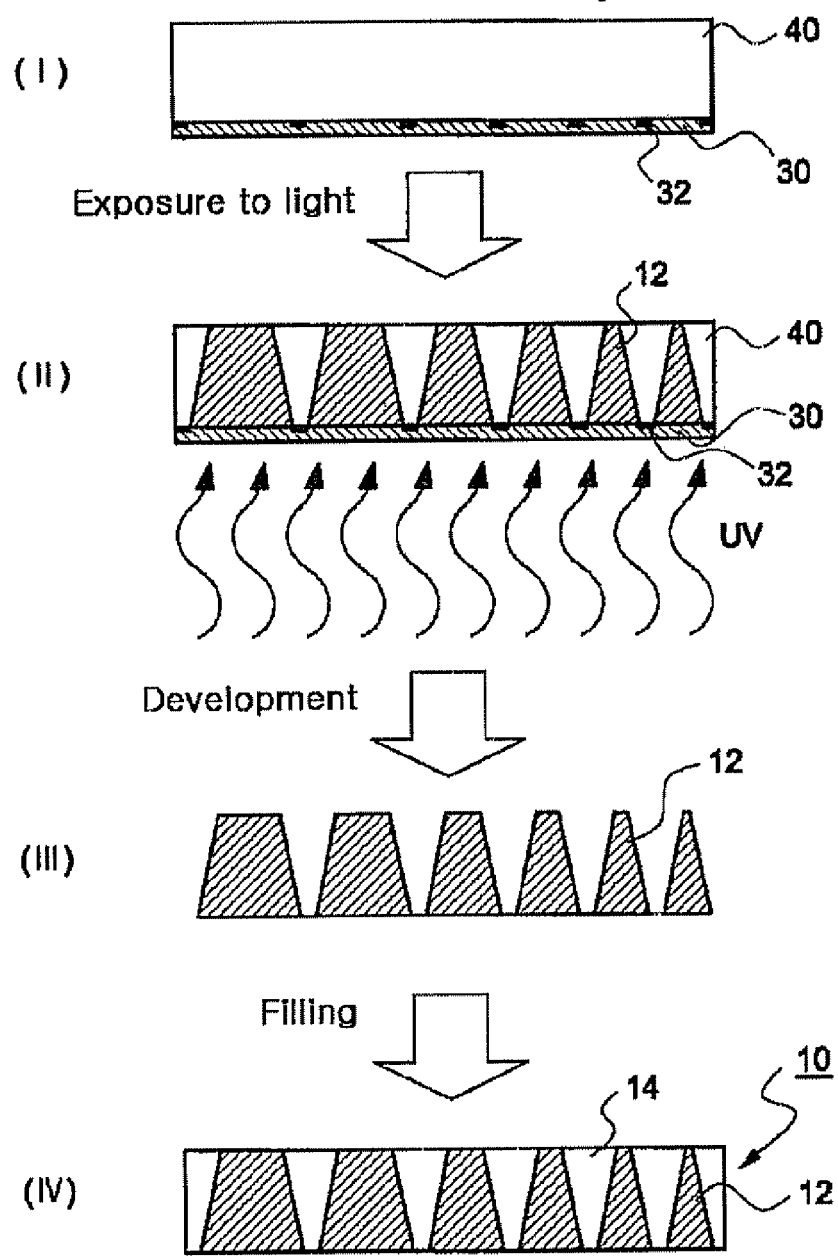
FIG. 18 is a process diagram explaining a method of fabricating the optical device according to the second embodiment of the invention, which is illustrated in FIGS. 14 to 16.

FIG. 18 is a process diagram explaining a method of fabricating the optical device according to the second embodiment of the invention, which is illustrated in FIGS. 14 to 16. FIG. 19 is a plan view showing the grid structure of a photomask used in the manufacturing process of FIG. 18.

As illustrated in FIG. 19, a photopolymer 140 is coated on a photomask 130 having a grid structure, in which the line spacing is not uniform (I). As the photopolymer 140, an acrylic synthetic resin is preferred, which can be obtained, for example, by mixing ethoxylated (3) bisphenol A diacrylate, trimethylolopropane triacrylate, methyl methacrylate, n-butyl acrylate, 2-ethylhexyl acrylate, isodecyl acrylate, 2-hydroxy-ethyl acrylate with, as an additive, benzidimethyl ketal, alpha, alpha.-diethyloxy acetophenone, or the like.

Thereafter, ultraviolet rays are radiated on the photopolymer 140 from below the photomask 130. At this time, the ultraviolet rays are made to reach the front face of the photopolymer 140. For this purpose, of course, the thickness of the photopolymer 140 coated on the photomask 130 should be appropriately controlled. According to the light exposure, the photopolymer 140 is formed with waveguides 112 having non-uniform size, due to the photomask 130 having a non-uniform grid structure (II). In this embodiment, the waveguides 112 formed above have a uniform height, but have different sizes, i.e., different bottom and top faces and different sidewall gradients. In particular, the size of the waveguide 112 is gradually increased, but the sidewall gradient is gradually decreased towards the peripheral area of the optical device from the central area thereof. In FIG. 18, the right-hand side represents the central area of the optical device, and the left-hand side corresponds to the peripheral area of the optical device. In addition, the waveguides placed at the same distance from the central area have the same size and the same sidewall gradient.

After the light exposure, the remaining portions of the photopolymer 140 other than the waveguides 112 are developed and removed (III). Then, a valley-like space is formed between the waveguides 112. In the subsequent process step, the space is fined with a resin 114 having a low refraction index (IV). Of course, the resin 114 has a refraction index lower than that of the photopolymer. A light diffuser may be added to the low index resin 114.

As shown in FIGS. 1 and 5, in the optical display device 110 fabricated through the above process steps, the waveguides 112a to 112f have a uniform height. The size of the waveguides is gradually increased radially towards the peripheral area of the optical device 110 from the central area thereof. As described above, since the size of the waveguides 112a to 112f increases gradually and the sidewall gradient thereof decreases gradually toward the peripheral area, the transmissivity in the peripheral area of the optical device 110, which is far from the light source and thus has a smaller light quantity and/or a smaller incident angle, is improved, thus creating uniformity in the light distribution over the optical device.

Hereafter, the operation and effect of the invention will be explained in detail.

FIGS. 20 and 21 show the construction and characteristics of a conventional display device contrasting with the present invention. FIG. 20 shows a display panel such as an LCD or an LED, and FIG. 21 is a graph showing the luminance for every section of the display panel of FIG. 20. FIGS. 22 and 23 illustrate the operational effects of the above second embodiment. FIG. 22 illustrates a display panel having an optical device of the invention mounted thereon, and FIG. 23 is a graph showing the luminance for every section of the display panel of FIG. 22.

In the conventional display panel 150 where the optical device 10 of the invention is not mounted, as shown in FIG. 21, the luminance distribution is not uniform, i.e., the luminance value is highest in the central area of each pixel and decreases rapidly in the boundary areas between the pixels. In such conventional display devices, non-uniform lights are emitted from each section of the device, thus degrading the homogeneity in the image quality.

In contrast, as depicted in FIG. 22, in the case where the optical device 110 is mounted on the front face of the conventional display device 150 of FIG. 20, since the optical device 110 of the invention adjusts the light quantity over the whole area, the central area of the pixels and the boundary area in-between have a uniform luminance, as can be seen from FIG. 23. Thus, it can be seen that the image generated through the optical device 110 of the invention has a homogenized quality.

FIG. 24 shows a conventional optical device using a plurality of unit light sources, and FIG. 25 shows an optical device of the invention using a plurality of unit light sources.

As shown in FIG. 24, the light rays emitted from the unit light source 160 are very non-uniform, and the luminance thereof is very weak in the boundary area between the unit light sources. In contrast, in the optical device 110 of the invention, the light rays emitted from the unit light source 160 exhibit a uniform luminance over the entire device, as shown in FIG. 25.

Figure 26:
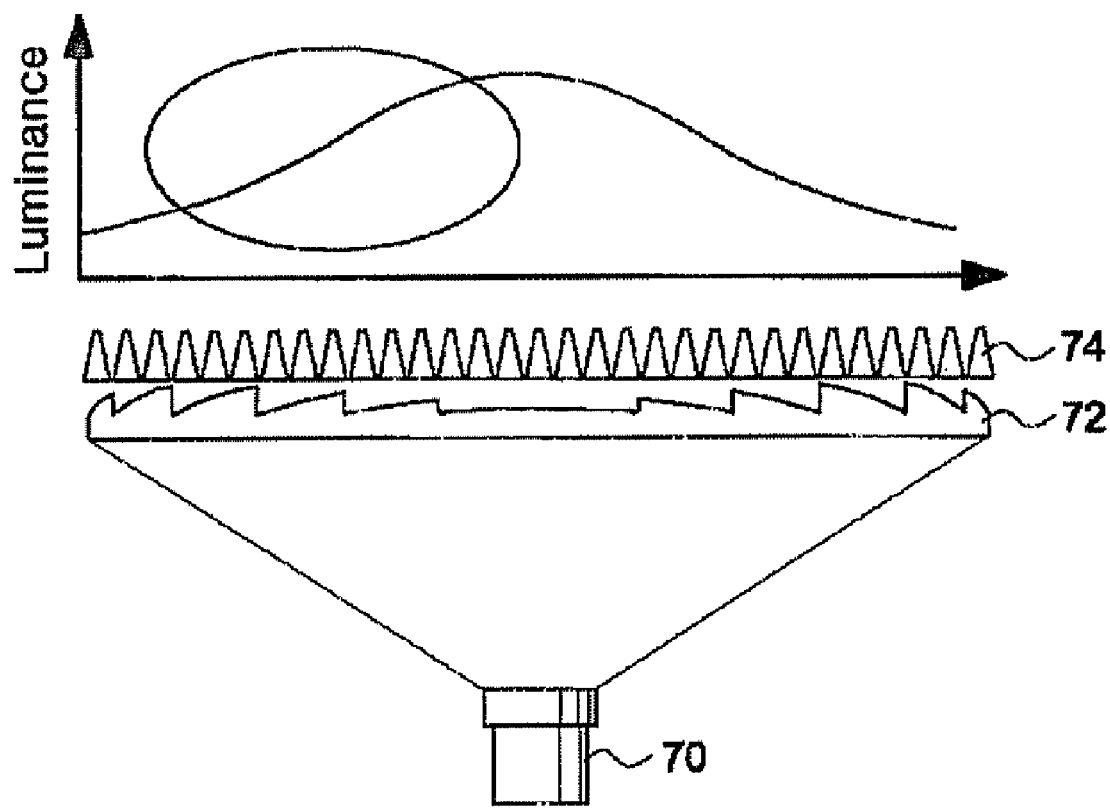
FIG. 26 depicts a conventional display device using a single diffusion light source.
Figure 27:
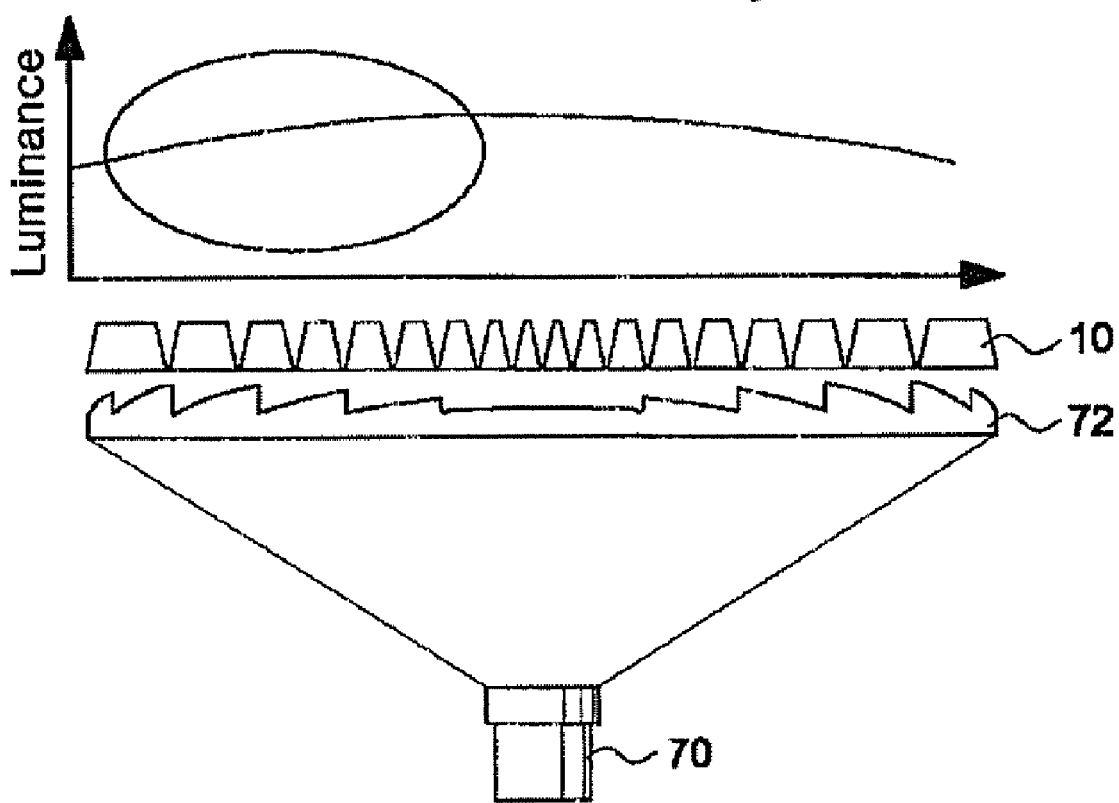
FIG. 27 illustrates an optical display device of the invention using a single light source.

In addition, FIG. 26 depicts a conventional display device using a single diffusion light source, and FIG. 27 illustrates an optical display device of the invention using a single light source.

In FIG. 26, the light rays emitted from a diffusion light source 170 pass through a Fresnel lens and are then projected through a diffusion plate 174, which is formed of uniform-sized waveguides. It can be seen from FIG. 26 that the luminance thereof is significantly decreased further away from the light source.

In contrast, as can be seen from the graph of FIG. 27, when the optical device 110 of the invention is employed, the luminance thereof is almost the same over the entire device, regardless of the distance from the light source 170. Thus, through the optical device of (be invention, a uniform luminance can be achieved, and consequently the homogeneity of projected image can be improved.

Figure 28:
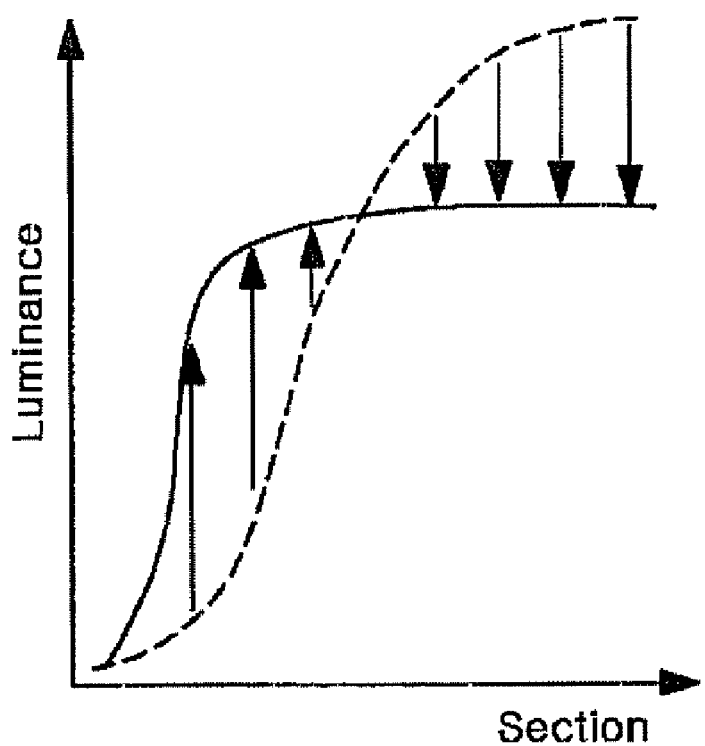
FIG. 28 is a graph contrasting the light characteristics of the optical device of the invention in FIG. 21 with the conventional one of FIG. 20.

FIG. 28 is a graph contrasting the light characteristics of the optical device of the invention in FIG. 21 with the conventional one of FIG. 20. In the graph of FIG. 28, the solid line represents the light characteristics of the invention, and the dotted line represents the conventional case. According to the invention, the display device can obtain great uniformity in luminance over We entire section thereof, i.e., the non-uniform light distribution (the dotted line) can be transformed into a uniform state (the solid line).

Figure 29:
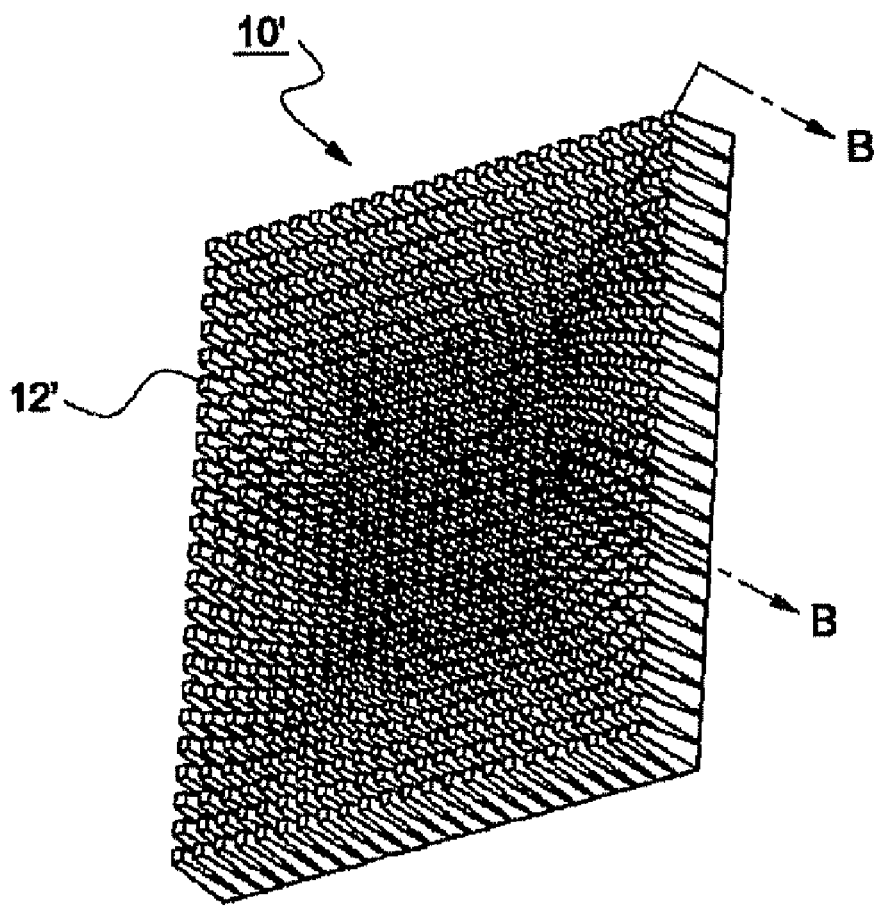
FIGS. 29 and 30 are a front and rear perspective view of an optical display device producing a uniform light distribution according to a tint embodiment of the invention.
Figure 30:
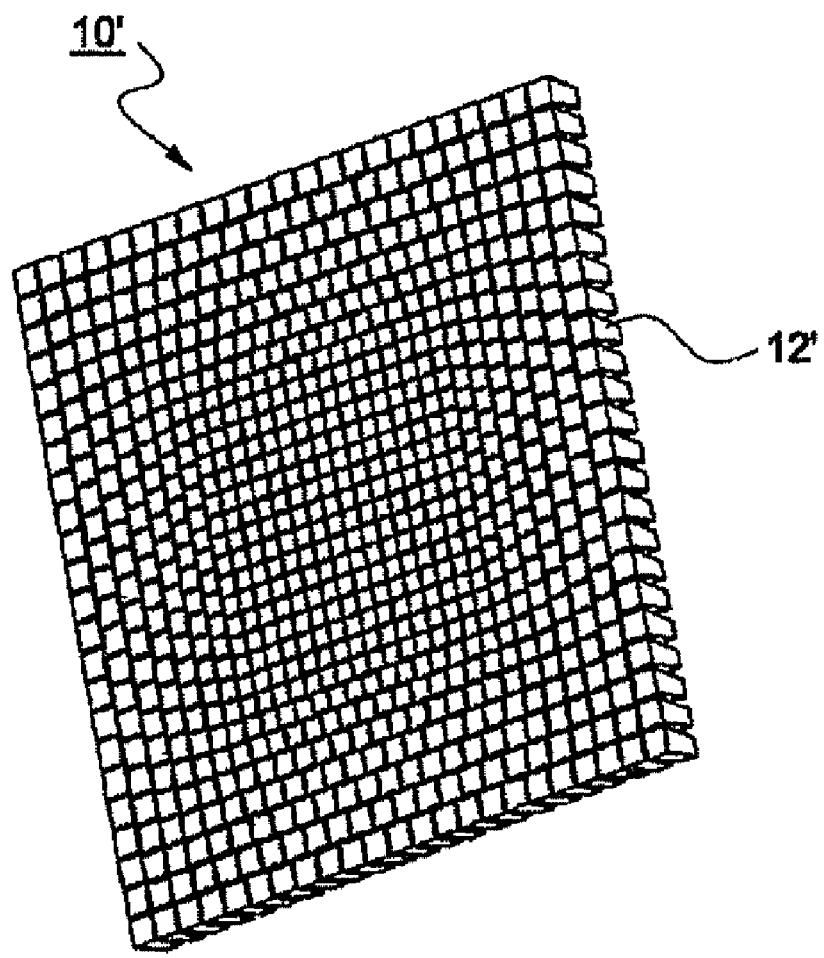
Figure 31:
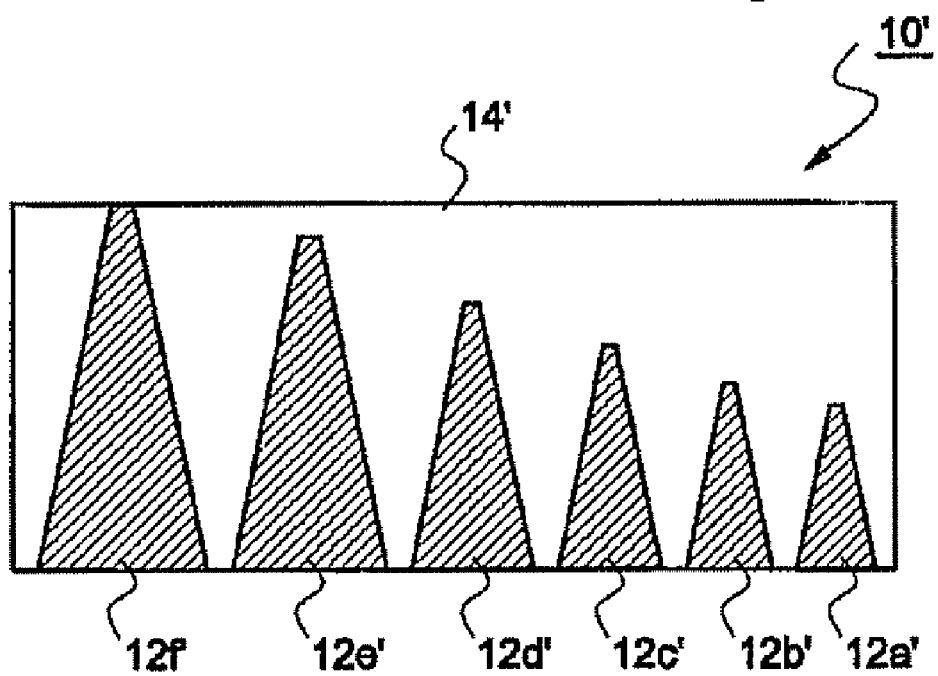
FIG. 31 is a sectional view taken along the line F-F in FIG. 29.

FIGS. 29 and 30 are a front and rear perspective view of an optical display device producing a uniform light distribution according to a third embodiment of the invention. FIG. 31 is a sectional view ten along the line F-F in FIG. 29. This embodiment illustrates a case of waveguides having non-uniform heights.

In this embodiment, the height of the waveguides 112' in the optical device 110' is not uniform, but increases gradually towards the peripheral area of the device from the central area thereof. More specifically, as shown in FIG. 31, the height of the peripheral waveguide 112f in the optical device 110' is higher than that of the central waveguide 112a', in such a manner that the peripheral waveguides surround the central waveguides. The sidewall gradient is almost the same in all the waveguides 112'. The bottom side and the topside of the waveguides 112' are gradually increased the farther away they are from the center of the optical device 110'. Consequently, the size of the waveguides 112' increases gradually towards the peripheral area of the optical device 110'.

In addition, a resin 114' having a low refraction index is filled in the spaces formed between the waveguides 112'. The low index resin 114 has the same composition as in the previous embodiment, and in this embodiment the lower height waveguides 112a' to 112e' are embedded in the low index resin 114, as shown in FIG. 31. Therefore, in the central area of the device, the light rays are projected through the low index resin 114' after passing through the waveguides 112a' to 112e'. In the outermost waveguide 112f, its top surface is exposed so that the light rays are projected directly outward from the waveguide 112. Accordingly, since a relatively intense light is inputted into the central area and a relatively weak light is inputted into the peripheral area, the light intensity outputted from the optical device 110' of me invention comes to have a uniform light intensity (luminance).

FIG. 32 is a partial sectional view of another embodiment modified from that of FIG. 31. As shown in FIG. 32, a light diffuser 116' may be added to the low index resin 114', which is filled between the waveguides 112a' to 112f. The light diffuser 116' is mixed with the low index resin 114' in a liquid state and then the mixture of the light diffuser and the resin is filled between the waveguides 112a' to 112f. The composition of the mixture is preferred to be 70~80 wt % of the resin 114' and 20~30 wt % of the light diffuser 116'. The light diffuser 116' is formed of light transmissive fine spherical particles, the material, particle size and content of which can be controlled to adjust the light distribution. The light distribution is adjusted mainly by controlling the size and height of the waveguides 112a' to 112f', and the light diffuser 116' serves as an auxiliary means for controlling the light distribution.

FIG. 33 is a process diagram explaining a method of fabricating an optical device according to the third embodiment of the invention and illustrated in FIGS. 29 to 31.

A photopolymer 140' is coated on a photomask 130' (i). The coated photopolymer 140' layer has a higher thickness relative to the second embodiment. At this time, the photomask 130' has a grid structure whose line spacing is not uniform. Then, ultraviolet (UV) rays are radiated on the photopolymer 140' from below the photomask 130'. At this time, the ultraviolet rays reach the front face of the photopolymer 140' at the outermost area thereof, but do not reach the front face of the photopolymer 140' at the remaining area. Specifically, towards the central area of the optical device, the reaching point is farther away from the front nice of the photopolymer 140'. Then, due to the grid 132' of non-uniform spacing in the photomask 130', the waveguides 112' formed in the photopolymer 140' have a non-uniform size (ii). That is, since the grid 132' spacing increases towards the outer area from the central area (from the right hand side to the left hand side in the figure), the formed waveguides 112 have different bottom sides and top sides, i.e., a gradually increasing height towards the peripheral area. At this time, the sidewall gradient of the waveguide may be formed to be the same or different.

After the light exposure, the remaining portion in the photopolymer 140' except for the waveguides 112' is developed and removed (iii). Then, a valley-like space is formed between the waveguides 112'. In the subsequent process step, the space is filled with a resin 114' having a low refraction index (iv). The low index resin 114' covers the waveguides except the outermost waveguide 112' in such a way that the surface of the low index resin 114 is aligned with the light output surface of the outermost waveguide. Of course, the resin 114' has a refraction index lower man that of the photopolymer 140'. A light diffuser (not shown) may be added to the low index resin 114'.

As depicted in FIGS. 29 to 31, the optical display device 110' fabricated as described above is structured in such a manner that the height and size of the waveguides 112' to 112f is increased gradually toward the radially peripheral area of the optical device 110' from the central area thereof. In this way, since the waveguides have an increasing height and size towards the outer area, the transmissivity in the peripheral area of the optical device 110', which is far from the light source and thus has a smaller light quantity and/or a smaller incident angle, is improved, thus providing uniformity in the distribution of light over the optical device.

Figure 35:
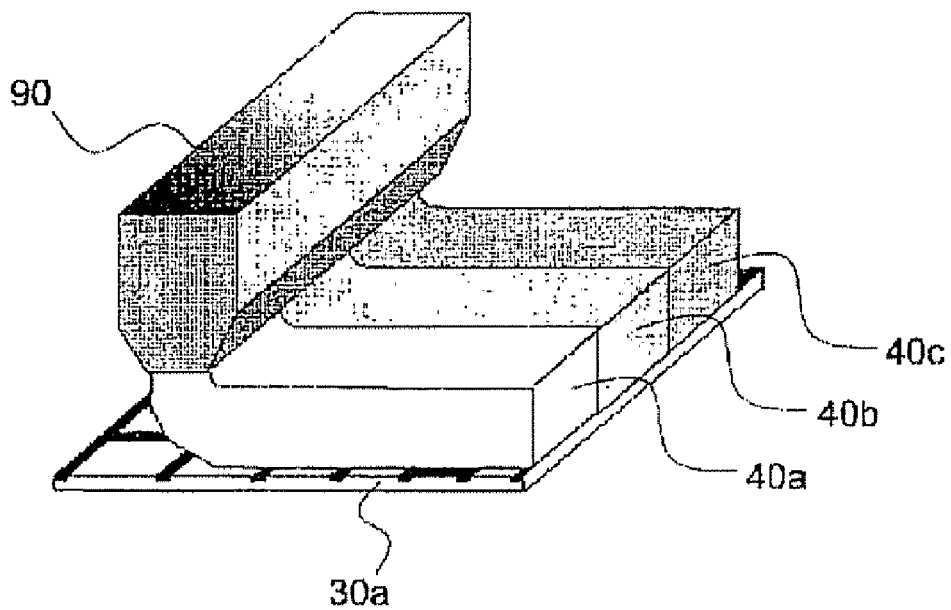
FIGS. 35 and 36 explains a method of fabricating the optical display device of FIG. 34.
Figure 36:
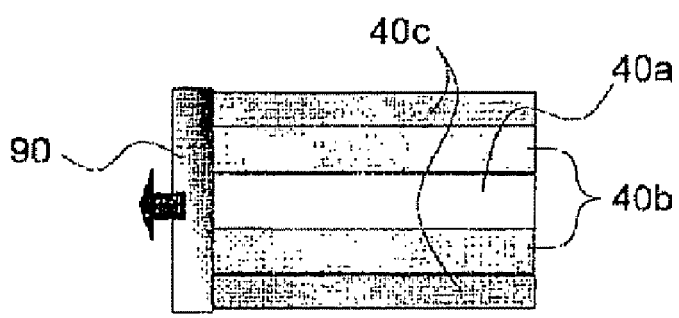

FIG. 34 is a partial sectional view of an optical display device producing a uniform light distribution according to a fourth embodiment of the invention. FIGS. 35 and 36 explain a method of fabricating the optical display device of FIG. 34, more specifically, FIGS. 35 and 36 are a perspective view and a plan view showing a photopolymer coating method.

As shown in FIG. 34, the waveguides 112g to 112i of the invention may have different refraction indices to adjust the light distribution thereof. Specifically, photopolymer 140a, 140b and 140c having different region indices are coated on different sections of the optical device, considering the light quantity and/or the incident angle for each respective section. Then, as in the previous embodiments, through light exposure and development, the waveguides 112g, 112h, and 112' having different refraction indices respectively are formed. For example, as illustrated in FIG. 35, a multi-nozzle coating die 190 can be used to coat the photopolymers 140a, 140b, and 140c of different indices on the photomask 130a while moving the die 190 along the photomask. In particular, as illustrated in FIG. 36, the photopolymers are coated in such a manner that the refraction index thereof becomes different towards both vertical end areas from the central horizontal line (the highest intensity of light). At this time, it is preferable that the refraction index is highest in the central horizon area and becomes lower gradually towards both vertical end portions. For example, the photopolymer 140a in the central horizontal area has a reaction index of 1.60, the photopolymer 140b in the first adjacent horizontal areas has a refraction index of 1.50, and the photopolymer 140c in the second adjacent horizontal areas (the lowest intensity of light) has a refraction index of 1.40. In this way, different photopolymers 140a, 140b, and 140c having different refraction indices can be coated on different sections of the optical device, and, through subsequent light exposure and development procedures, waveguides 112g, 112h and 112I having different refraction indices can be obtained. In this embodiment, the size and height of each waveguide may be made to be the same as shown in FIG. 34, or different for every section as in the previous embodiments. Of course, the low index resin 114a filled between the waveguides 112g, 112h, 112i is preferred to be no more than 1.35, i.e., lower than that of the photopolymers 140a, 140b and 140c.

Figure 37:
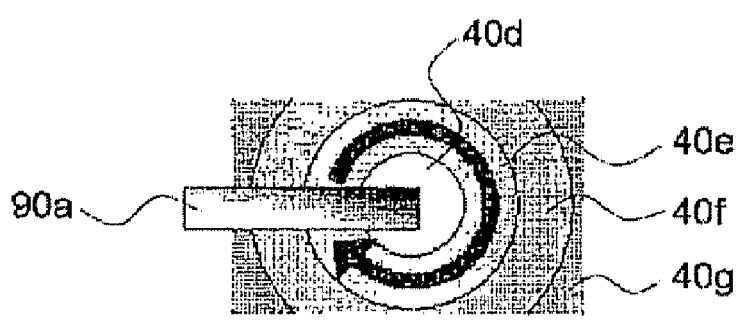
FIGS. 37 and 38 illustrate modifications for the fourth embodiment of the invention.
Figure 38:
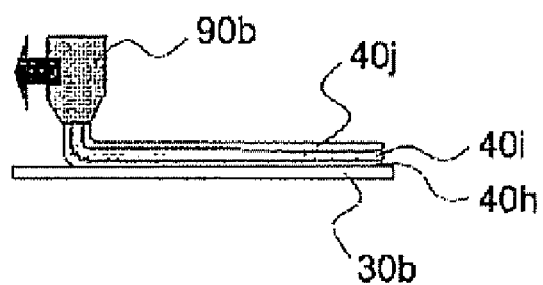

FIGS. 37 and 38 illustrate modifications for the fourth embodiment of the invention. FIG. 37 is a plan view of a modification for the fourth embodiment. FIG. 38 is a side view for another modification for the fourth embodiment.

As illustrated in FIG. 37, photopolymers 140d, 140e, 140f, and 140g having different refraction indices are coated on a photomask in concentric patterns about the center of the optical device. That is, the photopolymer is coated in such a way that the refraction index thereof is decreased gradually toward radially peripheral areas of the device from the center thereof. Thus, the formed waveguides through subsequent light exposure and development have a gradually decreasing index toward the peripheral area in the radial direction, and the waveguides at the same distance from the center have the same refraction index. This concentric photopolymer coating can be performed by rotating a multi-nozzle coating die 190a about the center of the optical device.

On the other hand, as illustrated in FIG. 38, the photopolymer may be coated on a photomask 130b in multiple layers, and the multi-layered photopolymer coating 140h, 140i and 140j can be used for providing a special function to the optical device.

INDUSTRIAL APPLICABILITY

As described above, in the screen according to the invention, the sidewall gradient of waveguides is made different for each section, depending on the incident angle of imaging light rays inputted into the waveguides. Thus, the imaging light can be projected at desired angles, for example, in an advertisement board where the viewing angle is of importance. In addition, the sidewall gradient of waveguides can be controlled to adjust the viewing angle, such that only a single viewer can see the screen, excluding other neighboring people. Thus, great performance can be achieved, for example, in a surveillance monitor where secrecy is of importance.

Furthermore, according to the present invention, in a case where plural unit light sources are used, the light intensity in the boundary area between the light sources can be adjusted to be uniform over all the sections of the display device. In addition, in the case of a single diffusion light source, the light intensity can be made almost uniform over the central and peripheral areas of the device.

Thus, the optical display device of the invention can be applied advantageously to a projection screen, a display for an advertisement board, or a security screen in order to obtain a distinct, clear and high-quality image.

Although the present invention has been described with reference to several preferred embodiments, the description is illustrative of the invention and not to be construed as liming the invention. Various modifications and variations may occur to those skilled in the art without departing from the scope and spirit of the invention, as defined by the appended claims.

The invention claimed is:

1. An optical display device uniforming light distribution throughout areas, the optical display device having waveguides arranged in vertical and horizontal directions, the waveguides having a conical shape whose cross-section decreases towards the light-projection side thereof, wherein the waveguides arranged in the central area near the light source of the optical display device have a smaller size and the size of the waveguides increases gradually towards the peripheral area from the central area such that intensity of projected light can be made uniform over all sections of the optical display device.

2. The optical display device according to claim 1, wherein the height of the waveguides is uniform over all sections of the optical display device.

3. The optical display device according to claim 1, wherein the height of the waveguide is designed to be different for each section, depending on incident angle and/or intensity of light inputted from the light source.

4. The optical display device according to claim 1, wherein a low index resin having a refraction index lower than that of the waveguide is filled in a space between the waveguides.

5. The optical display device according to claim 4, wherein a light diffuser is added to the low index resin.

6. The optical display device according to claim 5, wherein the light diffuser is formed of light-transmissive spherical fine particles, of which material, particle size, and contents are controlled to adjust light distribution.

7. The optical display device according to claim 4, wherein a light-absorbing material is added to the low index resin.

* * * * *

UNITED STATES PATENT AND TRADEMARK OFFICE
CERTIFICATE OF CORRECTION

PATENT NO.       : 7,711,231 B2                                              Page 1 of 1
APPLICATION NO.  : 11/569807
DATED            : June 2, 2010
INVENTOR(S)      : Gyuhwan Hwang et al.

It is certified that error appears in the above-identified patent and that said Letters Patent is hereby corrected as shown below:

Title Page, Item (30)

Foreign Application Priority data, should be added as follows:

"May 31, 2004   (KR)   ............................................ 10-2004-0039310"
"Jan. 8, 2005   (KR)   ............................................ 10-2005-0001957"

Signed and Sealed this

Seventeenth Day of August, 2010

David J. Kappos
*Director of the United States Patent and Trademark Office*